INVENTORS
H. P. ANDERSON
D. BAKER
J. M. FIELD
L. A. HOHMANN, JR.
L. L. MAUL
G. W. WELLS

BY Richard G. Levy
ATTORNEY

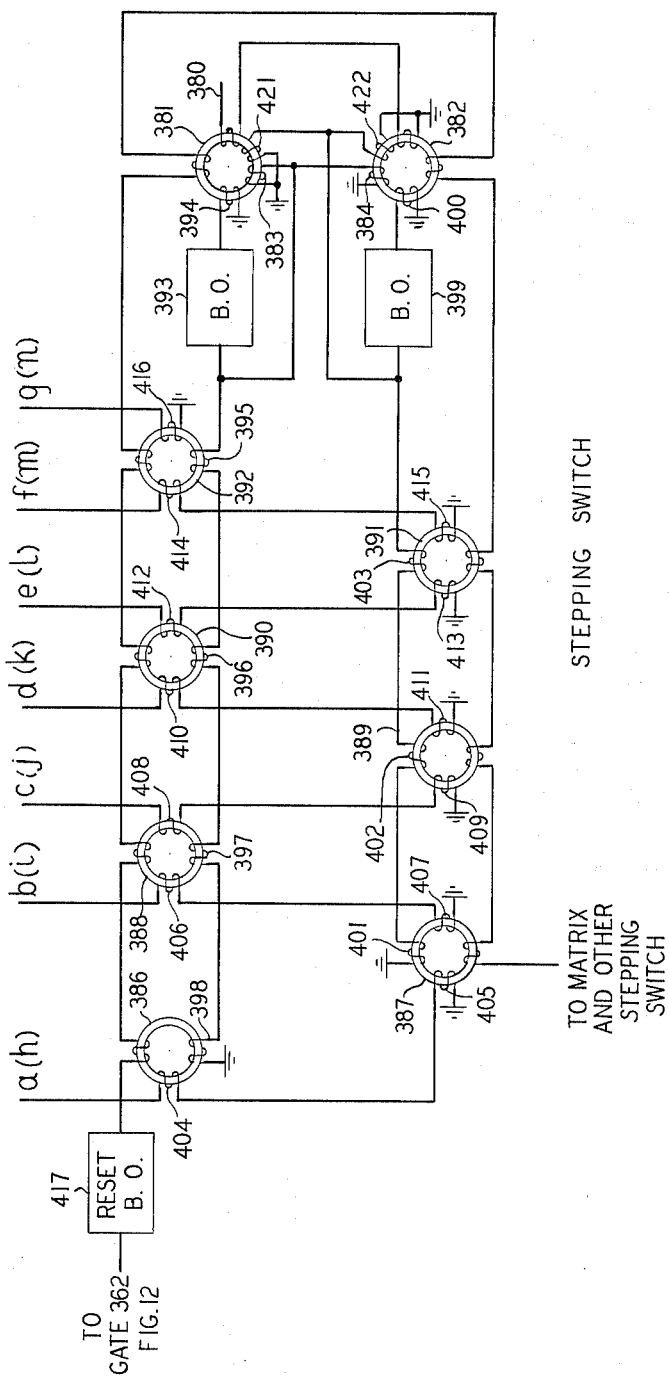

United States Patent Office 3,244,815
Patented Apr. 5, 1966

3,244,815
SELECTIVE SIGNALING SYSTEM
Harold P. Anderson, Lincroft, Donn Baker, Springfield, James M. Field, New Shrewsbury, Lawrence A. Hohmann, Jr., Middletown, and Lloyd L. Maul and George W. Wells, Lincroft, N.J., assignors to Bell Telephone Laboratories, Incorporated, New York, N.Y., a corporation of New York
Filed Mar. 20, 1963, Ser. No. 266,672
13 Claims. (Cl. 179—18)

This invention relates to key telephone systems, and more particularly, although in its broader aspects not exclusively, to selective signaling and switching systems which enable key telephone sets to provide a plurality of subscriber services and both visual and audible signaling with a minimum number of input conductors.

The economics of present day telephony, at least with respect to what may be termed the telephone plant, is experiencing a gradual but nonetheless perceptible shift in emphasis; to wit, labor, particularly installation, is rising in cost with respect to physical equipment. Although this generalization is applicable to most types of today's telephone systems, rising installation costs are particularly manifest in the category of key telephone systems.

As those familiar with key telephone systems are well aware, one of the most tedious and time consuming installation items is connection of individual station sets to a system's central equipment cabinet. In key systems of the type presently available as many as forty individual conductors may be required to enable a typical six key station set to achieve its full complement of service features. Many of these conductors are allocated to visual signaling, a separate pair of wires usually being assigned to each key lamp of a set to avoid visual cross modulation. Separate conductors are also generally provided for the transmission of subscriber service requests from each key to the central equipment cabinet. Although it is apparent that arrangements such as the foregoing involve considerable wiring duplication, a practical system remains to be introduced in which the number of station conductors are drastically reduced, while both the type and quality of available services remain undiminished.

Accordingly, it is a principal object of this invention to effect substantial economic savings in key telephony by reducing the number of conductors which electrically interconnect individual station sets of a key telephone system to the central switching and signaling equipment.

The objects of the invention are accomplished, broadly, by the novel application of time and space division multiplex techniques to key telephone systems. In one aspect of the invention, a key telephone set having a plurality of input signaling leads and a common return signaling lead is provided, each of the input leads being connectable to the return lead through a plurality of the set's key switches. Means are further provided for sequentially energizing the aforementioned input leads such that a unique signal is applied to each input lead per each key switch connected to that lead. The foregoing equipment is so arranged that the unique signals are transferable from the input leads to the return lead by closure of the key switches, and other apparatus is provided for detecting which one of the unique signals has been transferred to the return lead through a closed key switch and for initiating switching functions in accordance therewith.

In another aspect of the invention visual and audible signaling, as well as switching, are accomplished in a key telephone system by employing time and space division multiplex techniques. In one arrangement, a key telephone set comprises a plurality of input signaling leads and a plurality of indicators connected to each signaling lead, and means are provided for selectively energizing the input leads with a unique signal per each indicator connected to that lead. In the embodiment of the invention described herein, the unique signals differ from each other in polarity, and selectivity in energizing the indicators is affected by properly poled series diodes.

One feature of the invention resides in a simplified station set comprising key switches which are all of a nonlocking variety, and with which all services provided by a conventional key set are accomplished with a substantial reduction in the number of conductors emanating from the set.

Another feature of the invention resides in a time division multiplex arrangement whereby a series of time separated pulses, each pulse representing a specific subscriber service, is periodically transmitted to a key telephone set, and coincidence circuitry detects which of the pulses, if any, are returned from the set, thereby sensing the selection by a subscriber of an available service.

Still another feature of the invention resides in a space division multiplex arrangement in which the key switches of a station set are segregated into several groups. Each group has an associated input lead and the aggregate of the groups have a common return lead. A subscriber's request-for-service signal associated with the operation of any one switch originates on the input lead associated with the group containing that switch, and is returned from the set via the common return lead.

A further feature of the invention resides in a multiplex key telephone system in which time separated pulses transmitted to the individual station sets represent both subscriber services and dialing information. The stations in such an arrangement include two groups of key switches, one for translating pulses when services are to be represented, and the other for translating pulses when dialing information is to be represented.

Still another feature of the invention resides in an electronic key telephone system in which a key switch and a lamp or other indicator at a station share a single input lead, the key switch and indicator utilizing different signals. The key switch signals are ineffective to activate the indicator and means are provided for blocking the indicator signals from passage through the key switch in coincidence with the key switch signals.

The foregoing and other objects and features of the invention will be more thoroughly understood by reference to the following detailed description of an illustrative key telephone system embodying the invention, in conjunction with the accompanying drawings of which:

FIG. 9 illustrates the working spacial arrangement of FIGS. 2 through 8;

Figure 11:
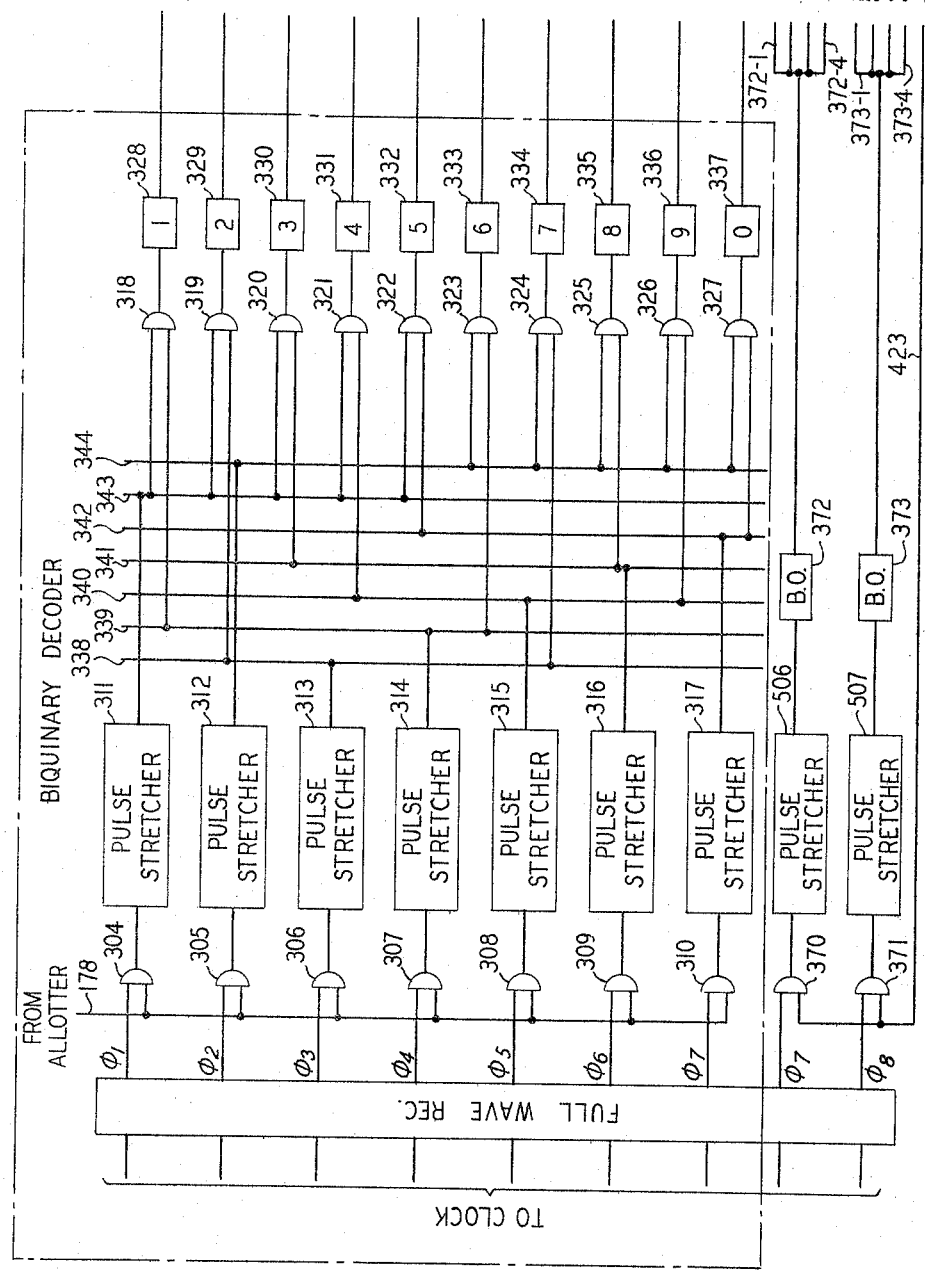
Figure 12:
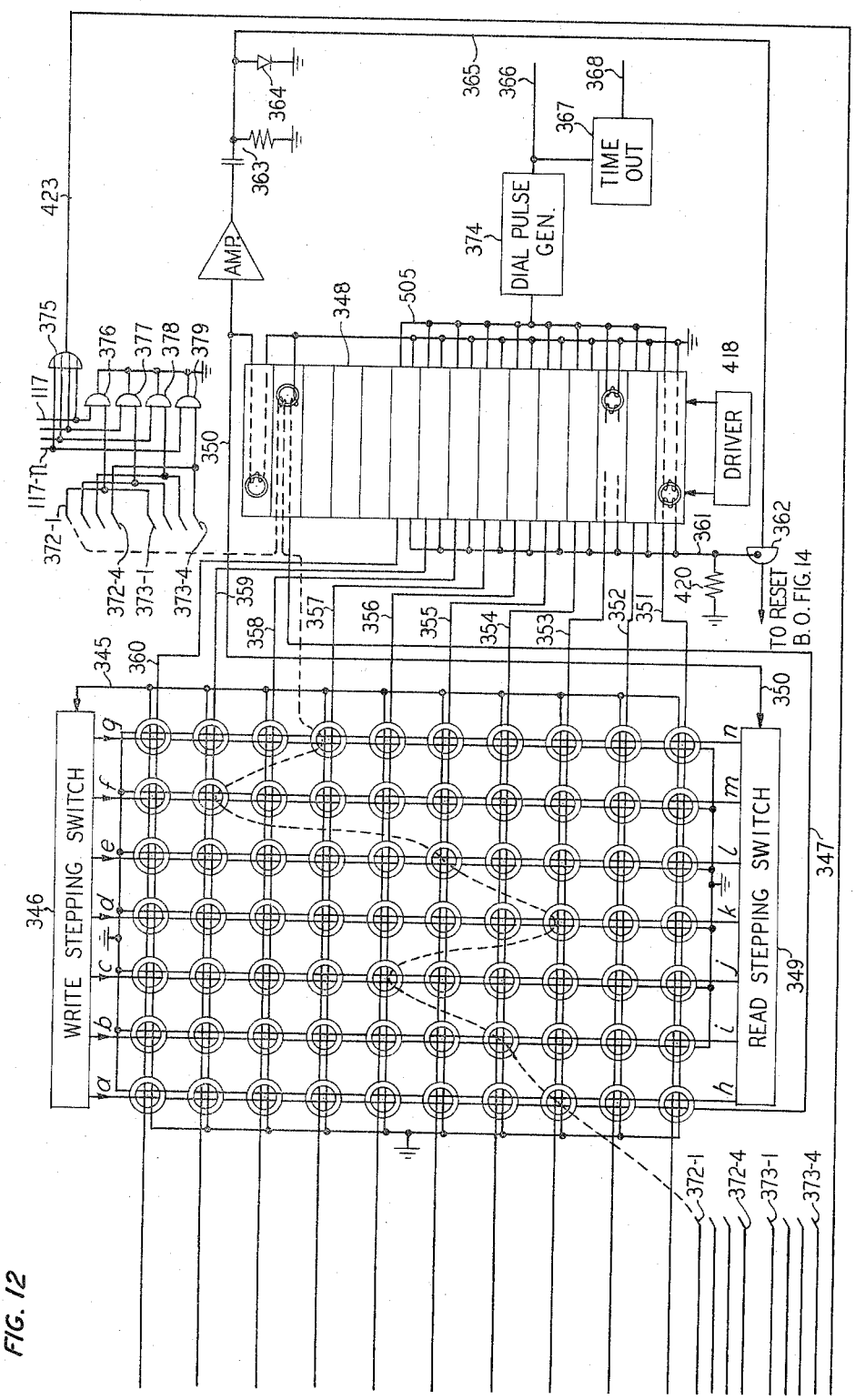

FIGS. 11 and 12, when spacially arranged as shown in FIG. 13, illustrates in detail the system's dialing facility; and FIG. 14 is a typical stepping switch of the type employed in the circuit of FIG. 12.

Throughout the drawings, the same elements when shown in more than one figure are designated by the same reference numerals.

Figure 1:
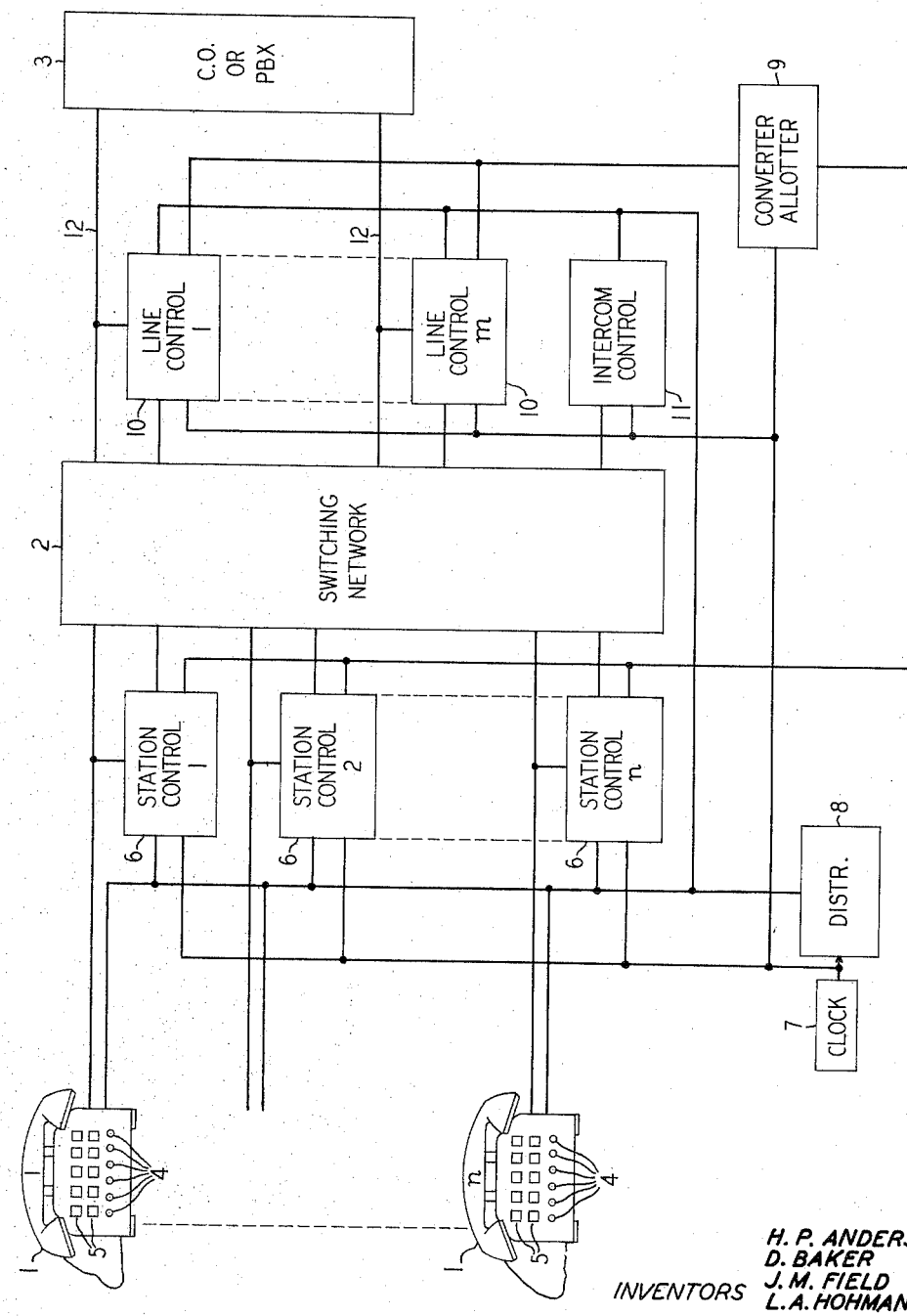
FIG. 1 is a block diagram showing the major functional components of the system and their general interconnection with each other.

FIG. 1 is a functional block representation of a key telephone system operative in accordance with the principles of the invention. As shown, the system comprises a plurality of subscriber station sets 1 which are selectively connectable through a switching network 2, and over lines 12, to a telephone terminal 3, which, by way of example, may be a remote central office or a PBX situated on a subscriber's premises. Included in each station is a plurality of key actuated switches 4 which are respectively associated with different service features available at that station, for example, hold, line selection, intercommunication, repertory dialing selection, etc. Also included in each station is a pushbutton dial array 5 for accomplishing the directory dialing usually performed by a conventional rotary dial. Associated with each station is an individual station control unit 6 for detecting which of the key switches 4 has been actuated, and consequently which of the available services is desired by a subscriber using the set. In addition to recognizing the desired service requests, station control units 6 also apply signals to switching network 2 to establish the various connections between a requesting station and the desired line or station.

The system also includes a clock 7 and a distributor 8 which coact to transmit a plurality of time and space multiplexed bipolar pulses to key switches 4, and simultaneously transmit companion pulses to station control units 6. The multiplexed pulses are generated periodically in identical frames, each frame including a separate pulse for each key switch 4 at a station 1. Each pulse of a frame represents a particular subscriber service available at a station, and the key switches are so arranged that when a key is actuated (depressed), the pulse representing the service designated by that key is transferred through the actuated switch. The transferred pulses are applied to the respective station control units 6 in coincidence with the corresponding companion pulses which are applied to the control units by clock 7. Coincidence detectors are provided in station control units 6 to recognize the concurrent arrival of pulses both from the station sets and from the clock, and responsively generate command signals which initiate the requested services.

The aforesaid time-space multiplexed pulses are also applied by distributor 8 to pushbutton dialing array 5, and companion pulses from clock 7 are applied to converter-allotter 9. The dialing array is so arranged that when a pushbutton 5 of one of the station sets is depressed, a pair of pulses from distributor 8 is transferred through that station and its associated station control unit 6 to the converter-allotter 9 in coincidence with the pair of companion pulses from clock 7. Converter-allotter 9, by means of coincidence detecting circuitry, recognizes which of the digit-representing pushbuttons has been depressed, and in response generates an appropriate number of interrupted direct-current dial pulses. The allotter portion of converter-allotter 9 functions both to allocate a dial pulse generator to a station set 1 on a request basis, and to apply the ensuing dial pulses to the proper line 12.

The system may comprise any number of lines 12, but for purposes of simplification, and not restriction, only two have been shown. Associated with each of the lines 12 is a line control unit 10 which recognizes conditions on the line, for example the presence of an incoming call, a busy line, a held line, etc., and transmits signals indicative of these conditions to distributor 8. In addition to generating the frames of multiplexed pulses which represent available services, as discussed above, distributor 8 also generates signals for energizing the audible and visual indicators at the station sets in response to the condition-representing signals from control units 10.

The system also includes an intercommunication control unit 11 which connects pairs of stations 1 together through a separate transmission path in switching network 3, and notifies the called party of this event.

Figure 2:
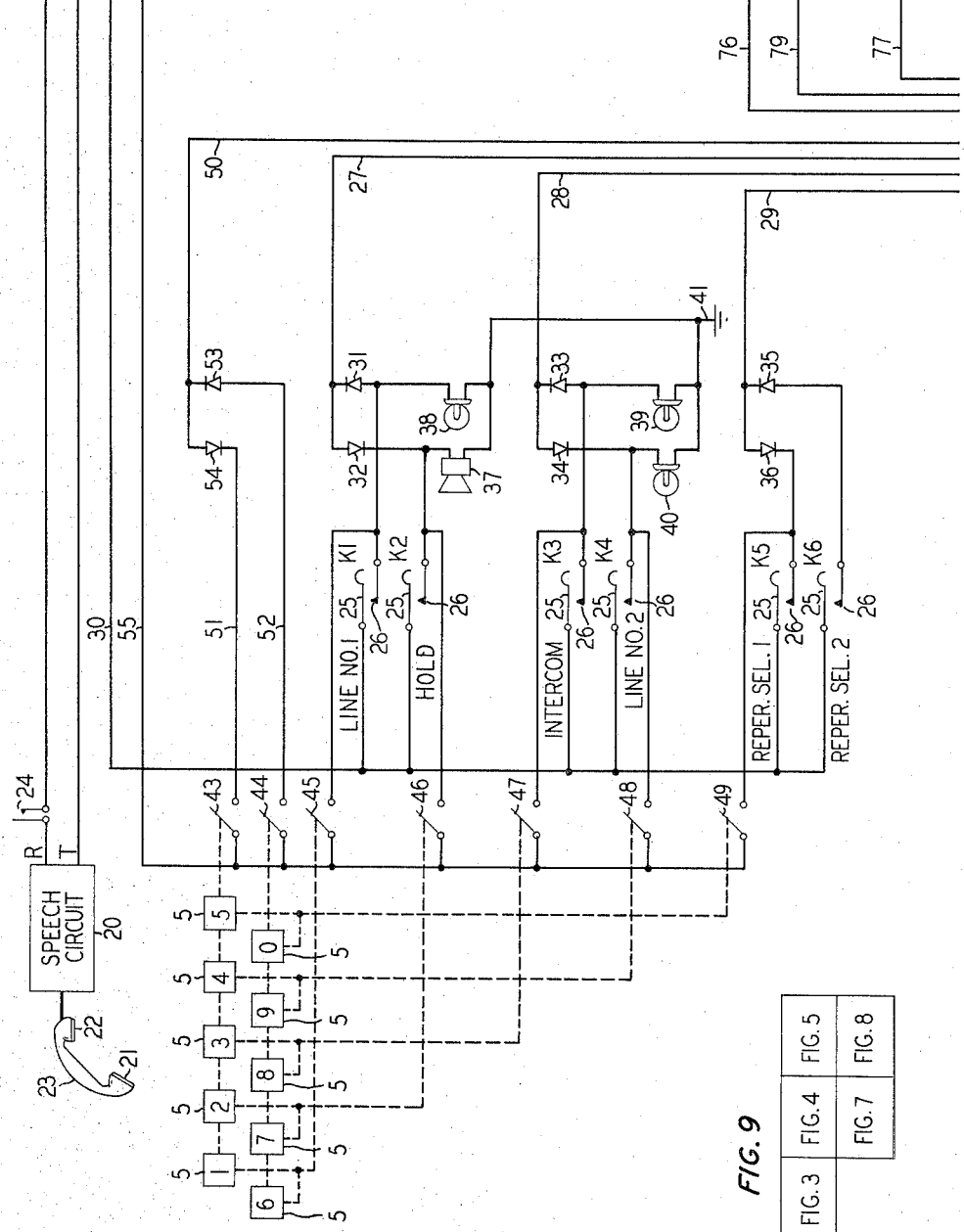
FIG. 2 illustrates a simplified key telephone set in which pushbutton dialing, key selection of subscriber services, and visual and audible signaling are accomplished with only a minimum number of depending conductors.

Illustrated in FIG. 2 is a subscriber telephone set designed to provide pushbutton dialing, key selection of a plurality of subscriber services, and audible and visual signaling, all with only a minimum number of input and output conductors. As is conventional, the set includes a pair of talking conductors, labeled T and R, which terminate in a speech circuit 20 having a transmitter 21 and receiver 22 housed, as usual, in a handset 23. The talking path also includes a serially connected switchhook 24, the contacts of which are normally apart as shown, but which close in conventional fashion when handset 23 is lifted from its cradle. The set also comprises six nonlocking key switches K1 through K6, each having a plunger 25 and an armature 26. Each key represents a separate subscriber service available at the set which, for illustrative purposes only, are shown as hold, line No. 1 selection, intercommunication, line No. 2 selection, repertory selection No. 1 and repertory selection No. 2, respectively.

In accordance with one aspect of the invention, the key switches are subdivided into separate groups, to wit, K1–K2, K3–K4 and K5–K6. Each of the aforementioned groups have a single input signaling lead, 27, 28 and 29 respectively, and in aggregate the key switches have a common return signaling lead 30. As shown in the drawing, input signaling lead 27 is connected to armature 26 of switch K1 through a diode 31 poled in a first direction, and is connected to armature 26 of switch K2 through diode 32 which is poled in the opposite direction. Similarly, input signaling leads 28 and 29 are respectively connected to armatures 26 of switches K3 and K5 through diodes 33 and 35 which are poled in the same direction as diode 31, and are also connected to armatures 26 of switches K4 and K6 through diodes 34 and 36 which are poled in the same direction as diode 32. In other words, each input signaling lead serves a separate pair of key switches, and selectivity of signal flow from input lead to key switches is accomplished by polarity discrimination through oppositely poled diodes.

In addition to input signaling leads 27 and 28 being connected to their respective key switches, these input leads are also connected to separate pairs of indicators. As shown, input signaling lead 27 is connected to a tone sounder 37 through diode 32 and to lamp 38 through diode 31. Similarly, lead 28 is connected to lamp 39 through diode 33 and to lamp 40 through diode 34. Each of the indicators 37 through 40 is connected to a common ground lead 41. Consequently, in accordance with a further aspect of the invention, input signaling leads 27 and 28 service a pair of indicating elements as well as a pair of key switches, signal selectivity also occurring on a polarity basis by means of the aforementioned oppositely poled diodes. Although indicators are shown associated with input signaling leads 27 and 28 only, it will become apparent as the description proceeds that indicators can be associated with input signaling lead 29 as well, were that lead associated with one or more key switches representative of services normally requiring lamp or tone indicators.

For dialing purposes the station set includes a pushbutton switch array comprising plungers 5 which severally represent the usual ten digits, one through zero, found on conventional rotary type dials, and 7 single-pole single-throw switches 43 through 49. As shown plungers 5 are mechanically linked with switches 43 through 49 such that the depression of a single plunger results in the closing of a unique pair of switches. More particularly, depression of the plungers representing any of the digits one through five results in the simultaneous closure of switch 43 and a distinct one of the switches 45 through 49, while depression of the plungers representing any of the digits six through zero results in the simultaneous closures of switch 44 and a distinct one of the switches 45 through 49. Associated with switches 43 and 44 is an input signaling lead 50 which is similar to input signaling leads 27 through 29 in the respect that it comprises a first branch 51 having a diode 53 and a second branch 52 having a diode 54, the diodes being poled oppositely to each other in the same manner as diodes 31 and 32. As shown, switches 45 and 46 are connected to input signaling lead 27 through diodes 31 and 32, respectively, switches 47 and 48 are connected to input signaling lead 28 through diodes 33 and 34 respectively, and switch 49 is connected to input signaling lead 29 through diode 36. To complete the dialing portion of the station set a common dialing return lead 55 connects together the armatures of switches 43 through 49.

Figure 10:
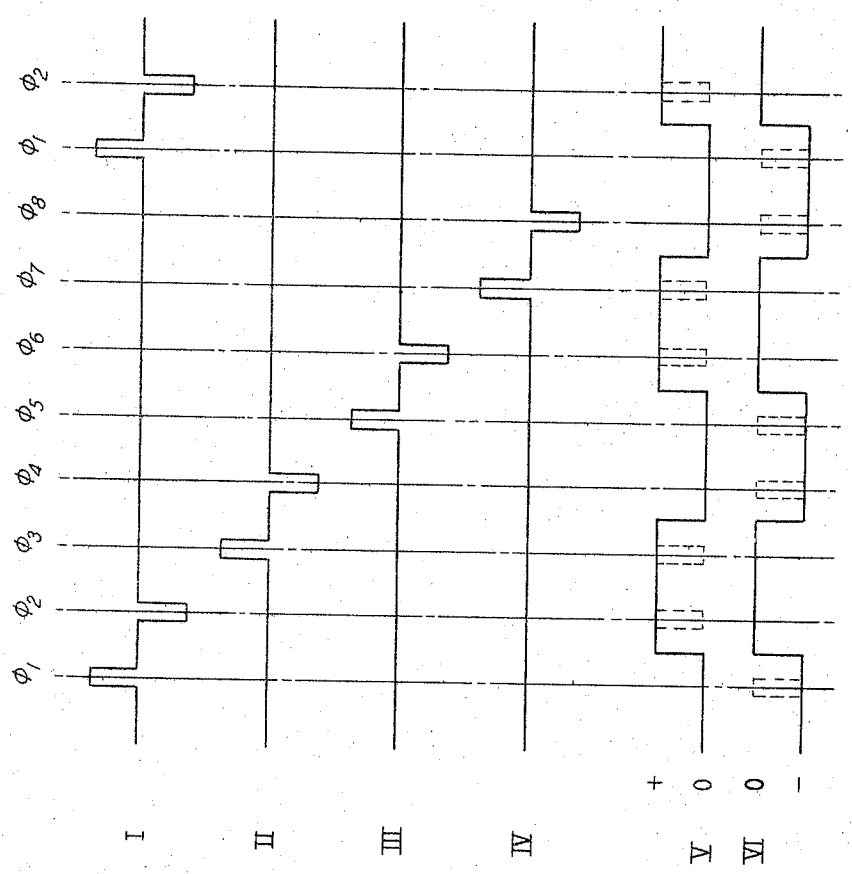
FIG. 10 illustrates the wave forms of pulsed energy transmitted from the distributor to a typical station set.

In accordance with the invention, time and space multiplexed signals generated by clock 7 and properly routed by distributor 8 (FIG. 1) are applied to a station set, such as the one of FIG. 2, via input signaling leads 27, 28, 29 and 50. The particular signals applied to the set are illustrated in FIG. 10 as falling into two distinct categories; namely, periodic service request pulses shown as wave forms I through IV, and periodic indicator activating pulses shown as wave forms V and VI. The service request signals are grouped into pairs of bipolar pulses, each pair being applied to the set by a different one of the input signaling leads 50 and 27 through 29. The pulses, or phases, occupy individual positions in time, and, in the embodiment described herein, are repetitive in frames of eight.

The indicator activating pulses, which function to selectively activate tone ringer 37 and lamps 38 through 40, are also arranged in time and space multiplex, and, as the service request pulses, are applied to the set by input signaling leads 27 and 28. As noted from the drawing, these signals are oppositely phased with respect to one another, or in other words, while one of the signals is supplying energy to its input signaling lead, the other is at a quiescent level. In order to prevent the transfer of indicator activating pulse to return signaling lead 30 during the service request phases, the indicator pulses are interrupted, as shown in broken line, during appropriate phases.

Figure 6:
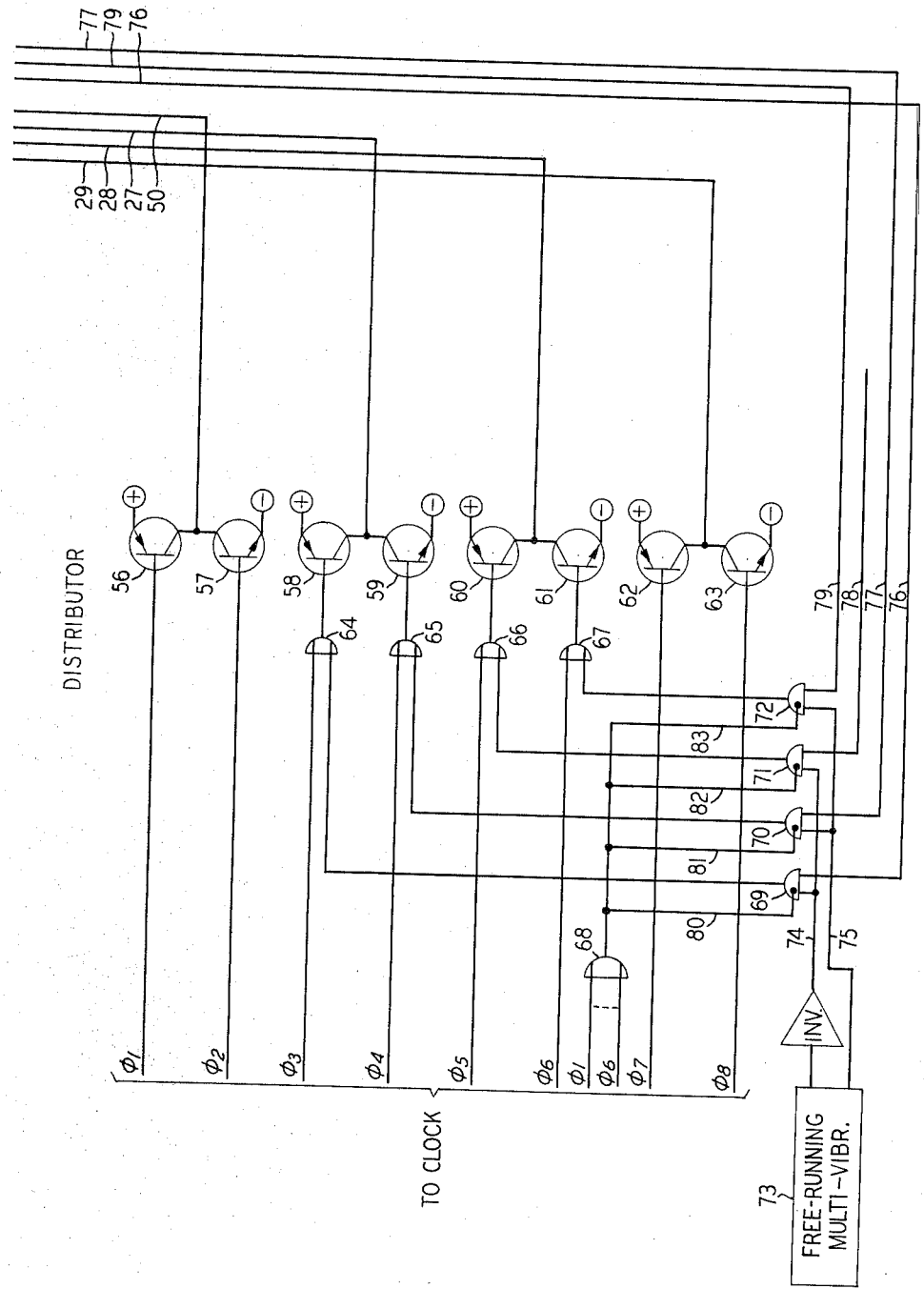
FIG. 6 illustrates a distribution circuit for selectively transmitting signaling energy to a typical station set.

The time and space multiplexed service request pulses are generated by a clock circuit (not shown) and are applied to a station set by the distributor illustrated in FIG. 6. Many types of clock circuits capable of generating successive frames of multiplexed service request pulses are well known to those skilled in the electronic counting art. By way of illustration, and not restriction, one such arrangement comprises a free-running ring counter, four monostable multivibrators, each one designed to remain in its unstable state for approximately a single interpulse interval, and four RC differentiating circuits, one connected to the initial negative-going terminal of each multivibrator. The ring counter is timed to activate the multivibrators in succession on alternate phases, and the differentiating circuits serve to reshape the output wave forms of the multivibrators from the usual rectangular wave to a pair of oppositely phased pulses. The output of each differentiating circuit is applied to the base electrodes of a separate pair of transistors of mutually opposite conductivity type arranged in the emitter follower configuration. Accordingly, each of the eight pulses emitted by the clock circuit appears on a separate conductor for application to the distributor.

The distributor comprises a plurality of transistors 56 through 63, a plurality of OR gates 64 through 68, a plurality of inhibit gates 69 through 72, and a free-running multivibrator 73. Transistors 56 through 63 are arranged in four identical groups, each group comprising one PNP and one NPN transistor having their collectors joined at a common junction which is also joined to one input signaling lead of the station set. The base electrodes of the transistors are coupled to separate output conductors of the clock circuit, and the emitters are connected to appropriately poled sources of potential.

More specifically, the first of the aforementioned groups comprises transistors 56 and 57 which have their collectors connected in common to input signaling lead 50 and their bases respectively connected to the $\phi1$ and $\phi2$ output conductors of the clock circuit. The second group comprises transistors 58 and 59 which have their collectors connected in common to input signaling lead 27 and their bases respectively connected to the $\phi3$ and $\phi4$ output conductors of the clock through OR gates 64 and 65. Similarly, the third group comprises resistors 60 and 61 which have their collectors connected in common to input signaling lead 28 and their bases respectively connected to the $\phi5$ and $\phi6$ output conductors of the clock through OR gates 66 and 67. Finally, the fourth group comprises transistors 62 and 63 which have their collectors connected to input signaling leads 29 and their bases respectively connected to the $\phi7$ and $\phi8$ output conductors of the clock.

The distributor also includes a symmetrical free-running multivibrator 73 having output terminals 74 and 75 (one of which is connected in series with a polarity inverter) which respectively yield wave forms V and VI of FIG. 10. As shown, output terminal 74 is connected to the base of transistor 58 through inhibit gate 69 and OR gate 64, and to the base of transistor 60 through inhibit gate 71 and OR gate 66. Similarly, output terminal 75 is connected to the base of transistor 59 through inhibit gate 70 and OR gate 65, and to the base of transistor 61 through inhibit gate 72 and OR gate 67. While output terminals 74 and 75 of multivibrator 73 constitute first input leads to inhibit gates 69 through 71, conductors 76 through 79, which originate from the station control and line control portions of the system and provide signals indicative of the conditions of the various lines and stations of the system, constitute second input leads to these gates.

Inhibit gates 69 through 72 also have inhibitory input leads 80 through 83, respectively, which are connected in multiple to the output terminal of OR gate 68. The input leads for OR gate 68 comprise the $\phi3$ through $\phi6$ output conductors of the clock circuit so that during the occurrence of the $\phi3$ through $\phi6$ service request pulses, inhibit gates 69 through 72 are prevented from translating a signal. Inhibit gate circuits such as those illustrated schematically as elements 69 through 72 function to translate a signal upon the simultaneous occurrence of two input signals and the absence of an inhibitory signal. Circuits of this type are well known to those skilled in the art and are discussed in length in Pulse and Digital Circuits by Messrs. Millman and Taub, published in 1956 by the McGraw-Hill Book Co., at pages 401 et seq.

Figure 3:
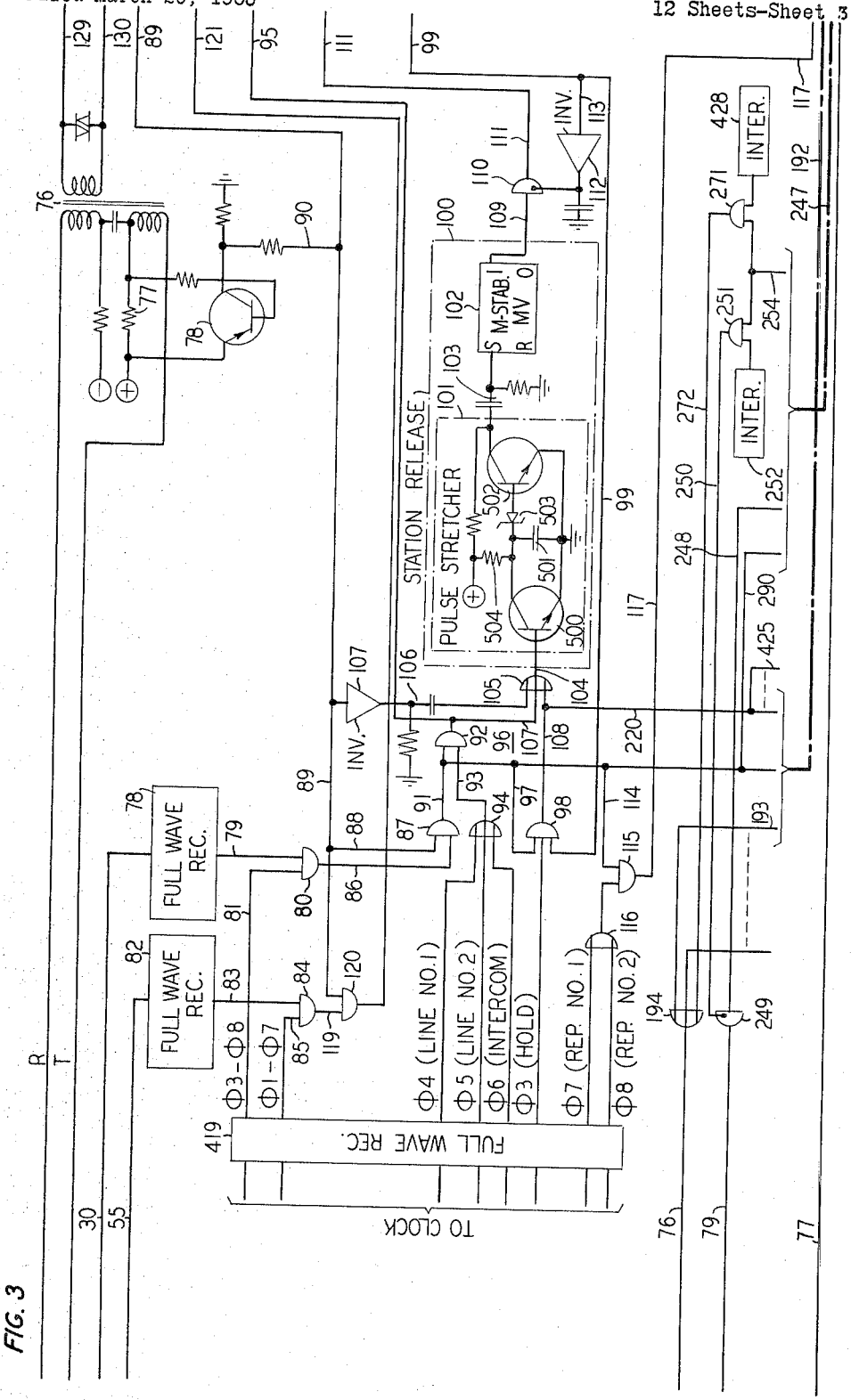
FIG. 3 illustrates a station control circuit for recognizing selected subscriber service commands and transferring information representative of the selected commands to subsequent portions of the system.
Figure 4:
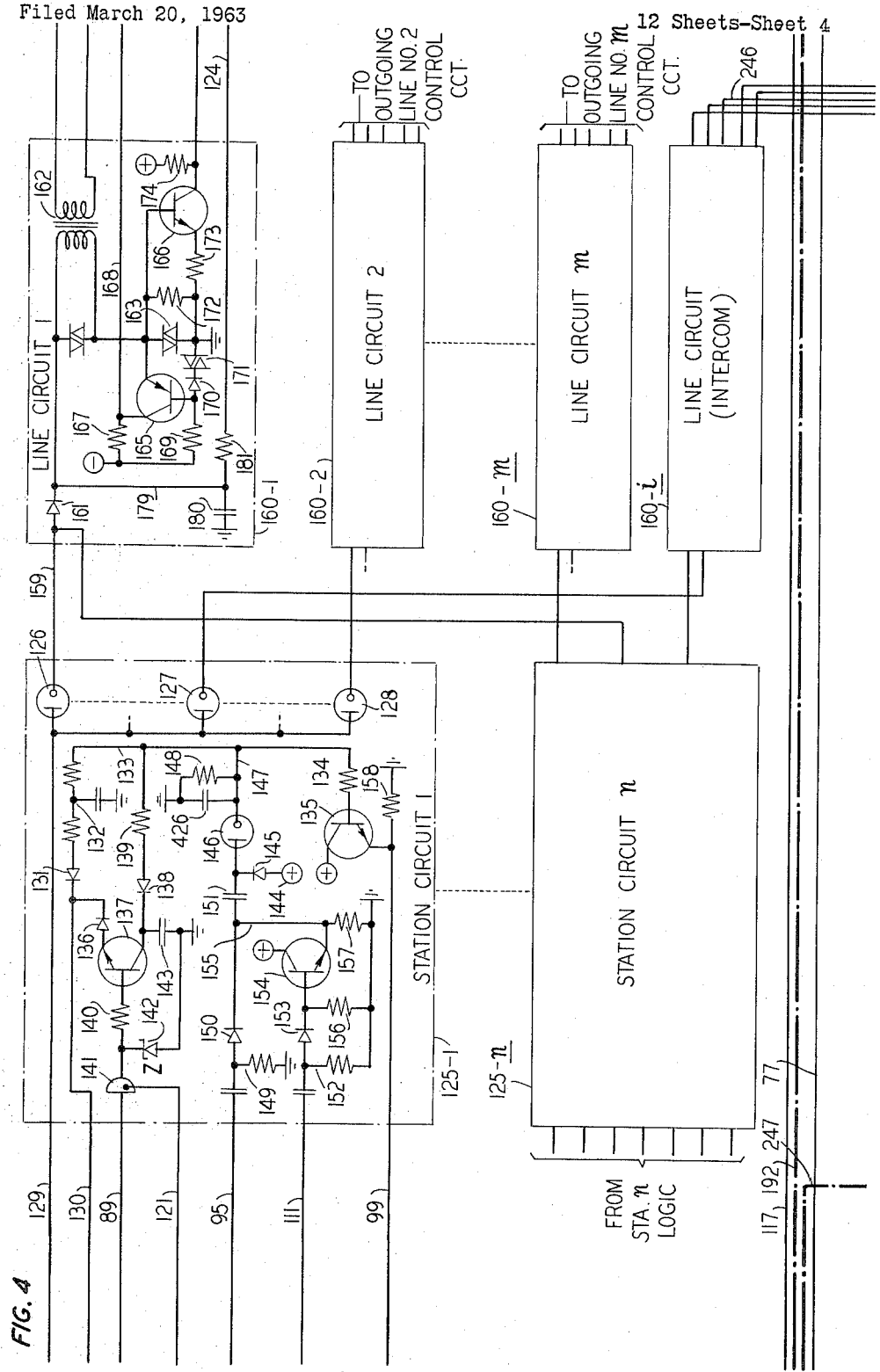
FIG. 4 depicts a switching network through which various of the system's station sets are selectively interconnected to various of the system's lines.

FIG. 3 shows a station control unit for a typical station set which recognizes subscriber service requests and transmits order signals representative of those requests to subsequent portions of the system. As shown in the drawing, the tip and ring conductors of the station set traverse the control unit and terminate in a transformer 76 which couples the speech circuit of the set to the system's switching network (FIG. 4). In addition to transformer 76, the tip and ring termination also includes sources of unidirectional potential which are poled to apply a positive voltage to the ring conductor and a negative voltage to the tip conductor. Connected in series with the tip conductor is a resistor 77, the potential across which governs the operation state of "off-hook recognition transistor" 78. Return signaling lead 30 enters the control unit and, after passage through full wave rectifier 78, emerges as conductor 79 which comprises one input terminal of coincidence gate 80. The other input lead to coincidence gate 80 is conductor 81 which connects through a full wave rectifier 419 to the Φ3 through Φ8 outputs of the clock circuit. It is to be noted that although rectifier 419 is shown as a single element for simplicity, it actually comprises a separate rectifier for each conductor terminating in the clock circuit.

Return dialing lead 55 also enters the station control unit, passes through full wave rectifier 82, and emerges as conductor 83 which serves as a first input lead to coincidence gate 84. The second input lead to coincidence gate 84 comprises conductor 85 which connects through full wave rectifier 419 to the Φ1 through Φ7 output conductors of the clock circuit. Coincidence gate 84 comprises an output terminal 119 which is connected to one input terminal of coincidence gate 120. The other input terminal to gate 120 is connected to a positive source of potential through conductors 89, 90 and transistor 78. The output terminal of gate 120 is connected to the switching network via conductor 121 in a manner, to be explained subsequently, which permits passage to converter 118 (FIG. 8) of pulses generated by the dialing array 5 of the station sets. Output conductor 86 of coincidence circuit 80 comprises one input lead of a coincidence gate 87 which functions to recognize that an available subscriber service is being requested. The second input lead to gate 87 is coupled to a positive source of potential when the station set is off hook through conductors 88, 89, 90 and transistor 78.

Output lead 91 of service request recognition gate 87 is connected to the switching network by two distinct paths, both of which must be energized simultaneously to establish a connection through the network. More specifically, gate 87 is connected to the switching network firstly through coincidence gate 92 and conductor 95, and secondly, through conductors 96, cable 192, conductor 120, OR gate 121, conductor 122, coincidence gate 123, inverter 420 and conductor 124. The second input to gate 92 is conductor 93 which comprises the rectified Φ4, Φ5 and Φ6 output conductors of the clock circuit combined in an OR gate 94. As labeled, the Φ4, Φ5 and Φ6 service request pulses, when coincident with pulses on conductor 91, respectively, represent commands that the calling station (FIG. 2) be connected through the switching network to outgoing line No. 1, the intercommunication line and outgoing line No. 2. Output conductor 91 of service request recognition gate 87 is also connected via conductors 96 and 97 to a first input terminal of coincidence gate 98 which functions to recognize a request by a subscriber to "hold" the line to which his station set is connected. The second input terminal to this gate 98 is connected through full wave rectifier 419 to the Φ3, or hold phase, output conductor of the clock circuit, and the third input terminal is connected to the switching network via conductor 99.

The station control unit also includes a station release circuit 100 which, as its name signifies, is operative to release a station from an existing connection through the switching network. Release circuit 100 comprises pulse stretcher 101 and monostable multivibrator 102 which are separated by a differentiating circuit 103. The input lead for release circuit 100 comprises conductor 104 which originates from the output terminal of OR gate 105 and is connected to activate pulse stretcher 101. The input leads to OR gate 105 are severally connected to a source of positive potential through differentiating circuit 106, inverter 107, conductors 89 and 90 and transistor 78, to the output terminal of the coincidence circuit 92 via conductor 107, and to the output terminal of coincidence gate 98 by conductor 108. Output terminal 109 of the station release emanates from monostable multivibrator 102 and is connected through inhibit gate 110 and conductor 111 to the switching network in a manner, as will subsequently be explained, to release the set associated with the station control unit of FIG. 3 from any existing connection through the switching network. An inverter circuit 112, having its input terminal 113 connected to conductor 99, serves as the inhibitory input for inhibit gate 110.

As shown, pulse stretcher 101 comprises a first transistor 500 having input conductor 104 connected to its base electrode and a capacitor 501 bridged across its emitter and collector electrodes, and a second transistor 502 having its collector electrode connected to differentiating circuit 103. The collector electrode of transistor 500 is coupled to the base of transistor 502 by a Zener breakdown diode 503 which is poled for forward conduction toward the former electrode. The impedance values of capacitor 501 and collector resistor 504 are so proportioned that with transistor 500 not conducting, capacitor 501 charges sufficiently through resistor 504 to place Zener diode 503 in a state of reverse conduction in a time interval slightly greater than a frame length of the service request pulses.

Output terminal 91 of service request recognition gate 87 is also connected via conductors 96 and 114 to an input terminal of repertory recognition gate 115. The other input terminals of repertory recognition gate 115 are connected through OR gate 116 and full wave rectifier 419 to the Φ7 and Φ8 output conductors of the clock circuit, which respectively represent repertory dialing selections Nos. 1 and 2. The output terminal of gate 115 is coupled by conductor 117 to converter 118 (FIG. 8) which, among other things, detects which of the repertory directory numbers has been selected by a subscriber and generates a corresponding sequence of dial pulses. Although FIGS. 2 and 3 show only a single station set and its associated station control unit, it will be apparent from FIG. 1 that a normal system includes many such station sets and, accordingly, a like number of station control units.

FIG. 4 illustrates a switching network through which any station set may be selectively connected either to other station sets of the system via the intercommunication facility, or to the system's outgoing lines. As shown in the drawing, the network comprises a plurality of identical station circuits 125–1 through 125–n, one for each station set, and a plurality of identical line circuits 160–1 through 160–m, one for each outgoing line, and 160–i for the conductors of the intercommunication facility which are treated as being similar to an ordinary outgoing line. The switching elements of the network, through which are established the various transmission paths interconnecting stations sets both inter se and to the various lines, are shown as crosspoints 126, 127 and 128. One type crosspoint which is particularly suited to switching networks such as that of FIG. 4 is a four-zone semiconductor element commonly known as a PNPN diode. Such elements are essentially bistable impedance devices which exhibit substantially open circuit characteristics until a threshold voltage is exceeded, and thereafter exhibit substantially short circuit characteristics so long as sufficient voltage is supplied to maintain the flow of a predetermined "sustaining current." PNPN diodes such as those described above are well known to the semiconductor art, and are described in detail in U.S. Patent 2,855,524, issued to W. Shockley on October 7, 1958. FIG. 4 shows station circuit 125–1 as including three crosspoints, one providing a transmission path from speech conductor 129 to line circuit No. 1, one providing a similar path to line circuit No. 2 and one providing a similar path to the intercommunication line circuit. It will become apparent as the description proceeds, however, that the crosspoint array shown can easily be rearranged to either extend or reduce the facilities to which a station set, via speech conductor 129, has access.

Station circuit 125–1 of the switching network comprises a first pair of input conductors 129 and 130 which emanate from the terminals of the secondary winding of transformer 76, and couple speech currents from an associated station set to the anode of crosspoints 126 through 128. Conductor 129, which is connected to the upper terminal of the secondary winding of transformer 76, is coupled in common to the anode electrodes of each of the crosspoints, and conductor 130, which is connected to the lower terminal of the secondary winding of the transformer 76, is coupled through a diode 131, a shaping circuit 132, conductor 133 and resistor 134 to the base electrode of "station memory" transistor 135. Shaping circuit 132 is essentially a low pass filter designed to decrease the slope of the leading edge of signals applied to the crosspoints of the switching network. Shunting diode 131 and shaping circuit 132 is a parallel current path comprising diode 136, the emitter-to-collector path of transistor 137, diode 138 and resistor 139, all serially connected in the order recited. The base electrode of transistor 137 is coupled to a positive source of potential through resistor 140, inhibit gate 141, conductors 89 and 90 and make contacts 78. To complete the circuit of transistor 137, the junction between resistor 140 and inhibit gate 141 is connected to ground through a Zener breakdown diode 142, and the collector electrode of transistor 137 is likewise connected to ground through capacitor 143. The bias supply for transistor 137 comprises positive source of potential 144 which is coupled to conductor 133 through diode 145, crosspoint 146 and conductor 147.

The inhibitory input to inhibit gate 141 comprises conductor 121 which emanates from coincidence gate 120 of the station control unit. Conductor 95 which is connected to the output terminal of coincidence gate 92 is connected to the anode of crosspoint 146 through differentiating circuit 149, diode 150 and capacitor 151. As shown, a resistor 148 in parallel with a capacitor 426 connects the cathode of crosspoint 146 to ground. Conductor 111, which transfers signals generated by station release circuit 100 of FIG. 3 is also connected to the anode of crosspoint 146 through differentiating circuit 152, diode 153, impedance transformation transistor 154, conductor 155 and capacitor 151. The collector electrode of transistor 154 is directly connected to a positive source of potential, and the base and collector electrodes of that transistor are connected to ground through resistors 156 and 157, respectively.

The cathode of crosspoint 126 is connected by conductor 159 to the line circuit 160–1 associated with outgoing line No. 1. As shown, conductor 159 is connected through a diode 161 to the upper terminal of the primary winding of transformer 162, the lower terminal of which is returned to ground through varistor 163. The secondary winding of transformer 162 is connected through a pair of "line seizing" make contacts 164 to outgoing line No. 1 which terminates at a switching facility such as a telephone central office or PBX. Included in line circuit 160–1 are a pair of transistors 165 and 166, the former being of the PNP and the latter of the NPN variety. The collector electrode of transistor 165 is connected through a resistor 167 to a negative source of potential and through a conductor 168 to the line control circuit (shown as 10 in FIG. 1) associated with outgoing line No. 1.

The base electrode of transistor 165 is also connected to a negative source through resistor 169 and to ground through diode 170 and varistor 171. The emitter electrode of transistor 165 is connected to the base of transistor 166 directly, and to the emitter of that transistor through series resistors 172 and 173, the junction between these last named resistors being connected to ground. The collector of transistor 166 is connected to a positive source of potential through resistor 174, and is also coupled to converter 118 (FIG. 8) through conductor 175, coincidence gate 176, OR gate 177 and conductor 178. The cathode of diode 161 is connected to the line control circuit associated with outgoing line No. 1 through conductor 179, a shaping circuit comprising audio-frequency blocking capacitor 180 and resistor 181, and conductor 124. The line circuits 160–1 through 160–m and 160–i of FIG. 4 are all identical to each other, the upper-most line circuit having been described in detail for illustrative purposes only. Accordingly, it will be apparent that the cathodes of crosspoints 127 and 128 are connected to their respective line circuits 160–m and 160–i in the same manner that the cathode of crosspoint 126 is connected to the upper-most line circuit. Similarly, all the station circuits 125–1 through 125–n are also identical to each other and have crosspoints similiar to those of the upper-most station circuit. Accordingly, the anodes of all crosspoints in station circuits 125–1 through 125–n are connected to their respective station circuits in the same manner that the anode of crosspoint 126 is connected to upper-most station circuit 125–1. Since all of the line circuits are identical, each one connects to its associated line control circuit (block 10 of FIG. 1) in substantially the same manner as upper-most line circuit 160 connects to the line control circuit illustrated in FIG. 5.

Figure 5:
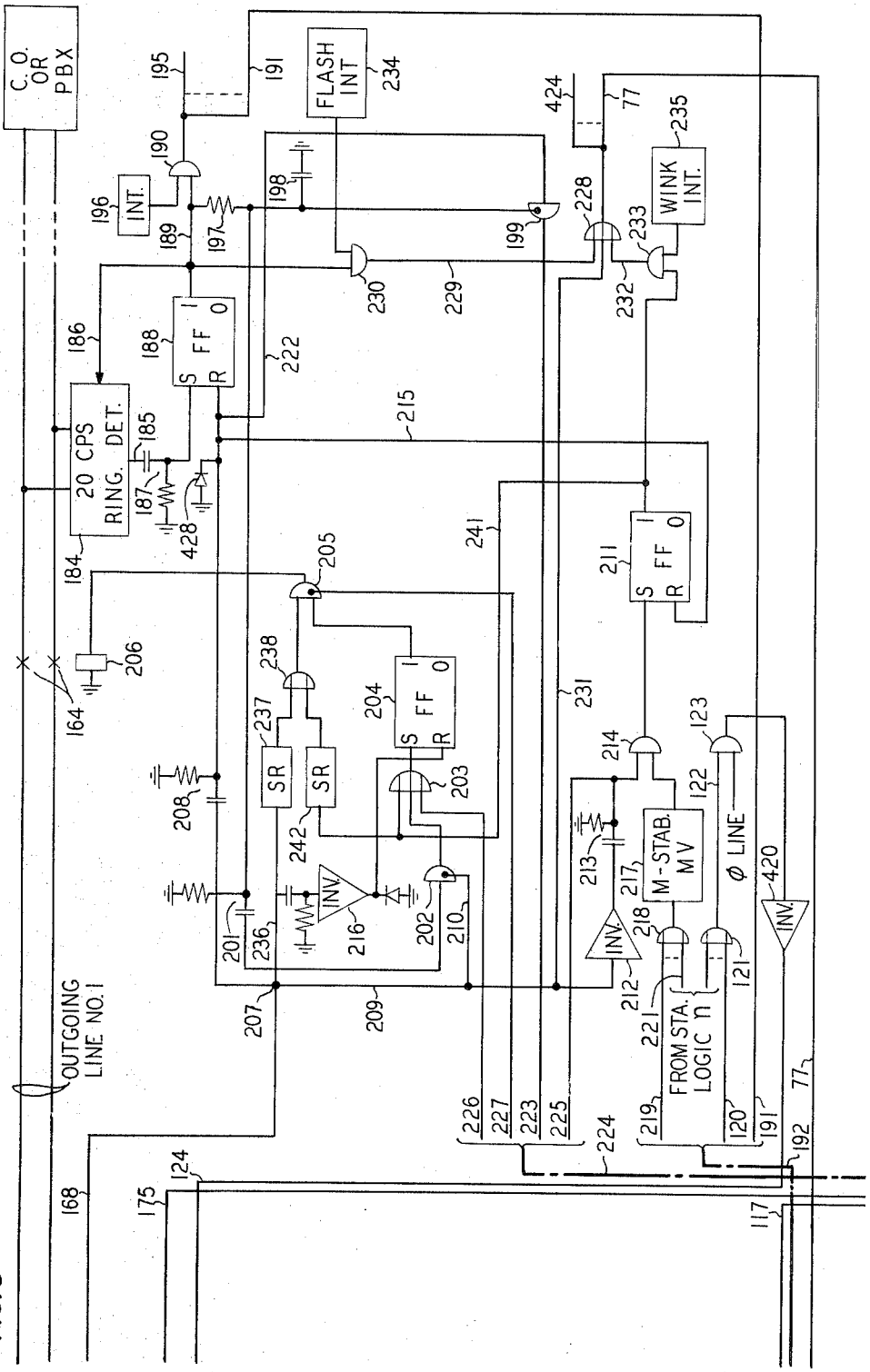
FIG. 5 shows a line control circuit which recognizes conditions on a line and transmits information indicative of those conditions to the system's visual and audible signaling circuits.

FIG. 5 illustrates the line control circuit associated with outgoing line No. 1. As will be explained below, the circuit is arranged to sense particular conditions on the line, for example the presence of an incoming call, whether or not the line is in the held condition, etc., and transmit control signals indicative of these sensed conditions through the distributor (FIG. 6) to the lamps and tone sounders of the station sets having access to that line. As shown, the line control circuit includes an envelope detector 184 bridged across the line and arranged to respond to conventional 20 cycles ringing signal. One example of a detector of the type described comprises a series LC circuit having a resonant frequency of 20 cycles per second, wherein the inductor of the circuit comprises one winding of a relay which when operated connects a positive source of potential to an output conductor 185. In addition the above-mentioned relay may include a second, or locking, winding which when energized via conductor 186 maintains the relay operated after the 20 cycle ringing signal subsides.

Output conductor 185 is connected through differentiating circuit 187 to the "S" terminal of a bistable multivibrator 188. As is conventional, the active elements of bistable multivibrator 188 are interconnected such that when a positive going signal is applied to the "S" terminal, a positive going signal responsively appears at the "1" terminal, and when a positive going signal is applied to the "R" terminal, a positive going signal responsively appears at the "0" terminal. The "1" terminal of multivibrator 188 is connected to four distinct portions of the system. Firstly, it is connected via conductor 186 to detector 184 to energize the locking winding of the aforementioned relay. Secondly, it is connected through conductor 189 and coincidence gate 190 to the station control units of all stations having access to the line. More specifically, the output terminal of coincidence gate 190 is connected through conductor 191 and cable 192 to conductor 193 (FIG. 3), which in turn is coupled through OR gate 194, conductor 76, and inhibit gate 69 to transistor 58 for controlling tone sounder 37 of a station set. The other output leads of coincidence gates 190, for example conductor 195, are connected through other station control circuits (not shown) in the same manner as conductor 191 to energize tone sounders 37 of the other station sets of the system which also have access to line No. 1. The second input lead to coincidence gate 190 emanates from an interrupter, or free running multivibrator 196, which causes the tone sounders to be activated at a distinctive rate, rather than to remain activated continuously.

Thirdly, the "1" terminal of multivibrator 188 is connected through conductor 189 and a delay circuit comprises resistor 197 and capacitor 198 to the inhibitory input terminal of inhibit gate 199; and fourthly, it is connected through conductor 189, resistor 197, conductor 200, differentiating circuit 201, inhibit gate 202 and OR gate 203 to the "S" terminal of bistable multivibrator 204. The "1" terminal of multivibrator 204 is connected through inhibit gate 205 and the winding of "line seizing" relay 206 to ground.

Conductor 168, which emanates from line circuit 160–1 of the switching network, is connected to junction 207, and from there branches to the "R" terminal of bistable multivibrator 188 through differentiating circuit 208, to the inhibitory input of inhibit gate 202 through conductors 209 and 210, to the "S" terminal of bistable multivibrator 211 through inverter 212, differentiating circuit 213 and coincidence circuit 214, to the "R" terminal of multivibrator 211 through differentiating circuit 208 and conductor 215 to one input terminal of inhibit gate 205 through conductor 236, slow release type delay circuit 237 and OR gate 238, and to the "R" terminal of multivibrator 204 through conductor 236, differentiating circuit 239, inverter 216, and negative pulse clipper 240. A second input terminal to coincidence gate 214 is connected to monostable multivibrator 217 which is in turn triggered through OR gate 218 by the station control circuit of the station sets having access to line No. 1. More specifically, one input to OR gate 218 is connected through conductor 219, cable 192, conductors 220 and 108 to the output terminal of "hold" gate 98. The other input conductors to OR gate 218, for example, conductor 221, are connected in a similar manner as conductor 219 to the outputs of the respective "hold" gates of the other station sets having access to outgoing line No. 1.

Figure 8:
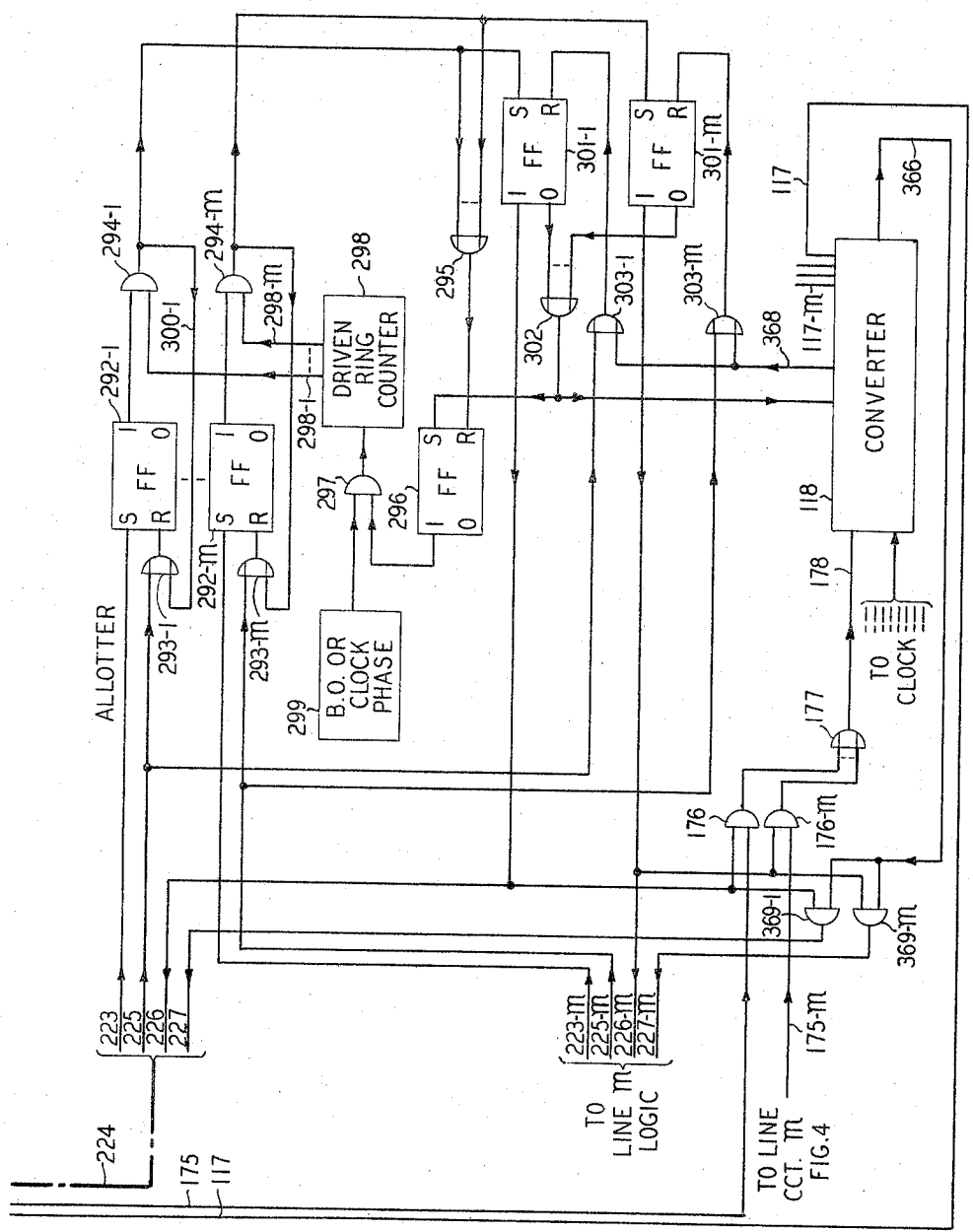
FIG. 8 depicts the system's dialing facility, shown in FIG. 1 as the converter-allotter, which receives multiplex coded dialing signals and retransmits this information to a selected line of the system in the form of conventional dial pulses.

In addition to being connected to the "R" terminal of multivibrator 188, the output terminal of differentiating circuit 208 is also connected through conductor 222, inhibit gate 199, conductor 223 and cable 224 to the allotter circuit of FIG. 8. Cable 224 comprises four conductors; namely conductor 223 which may be termed the "converter request" conductor because it notifies the allotter that a station desires to place an outgoing call over a particular line, conductor 225 which may be termed the "line disconnect" conductor because it notifies the allotter that a particular station set after once having requested the converter no longer desires access, conductor 226 which may be termed the "enable dialing" conductor because it notifies a station set that the converter is ready to accept dialing signals from that set, and conductor 227 which may be termed the "dial pulse" conductor because it applies conventional dial pulses from the converter to the outgoing line. As shown in FIG. 5, conductor 225 is connected to the output conductor of differentiating circuit 213 in multiple with an input terminal of coincidence gate 214. Conductor 226 is connected to the "S" terminal of multivibrator 204 through OR gate 203, and conductor 227 is connected to the inhibitory input of inhibit gate 205.

The line control circuit also includes an OR gate 228 the output of which is connected through conductor 77, inhibit gate 70 and OR gate 65 to transistor 59 to control the energization of the lamp 38 associated with outgoing line No. 1. OR gate 228 comprises three input leads, to wit, conductor 229 which is connected through coincidence gate 230 to the "1" terminal of bistable multivibrator 188, conductor 231 which is connected to the switching network via conductors 209 and 168, and conductor 232 which is connected through coincidence gate 233 to the "1" terminal of multivibrator 211. The "1" terminal of multivibrator 211 is also connected to the "S" terminal of multivibrator 204 through conductor 241 and OR gate 203, and to coincidence gate 205 through conductor 241, slow release type delay circuit 242 and OR gate 238. The second input terminals of coincidence gates 230 and 233 are respectively connected to interrupters 234 and 235 which cause lamp 38 to flash at distinctive rates indicative of the condition of the line.

Figure 7:
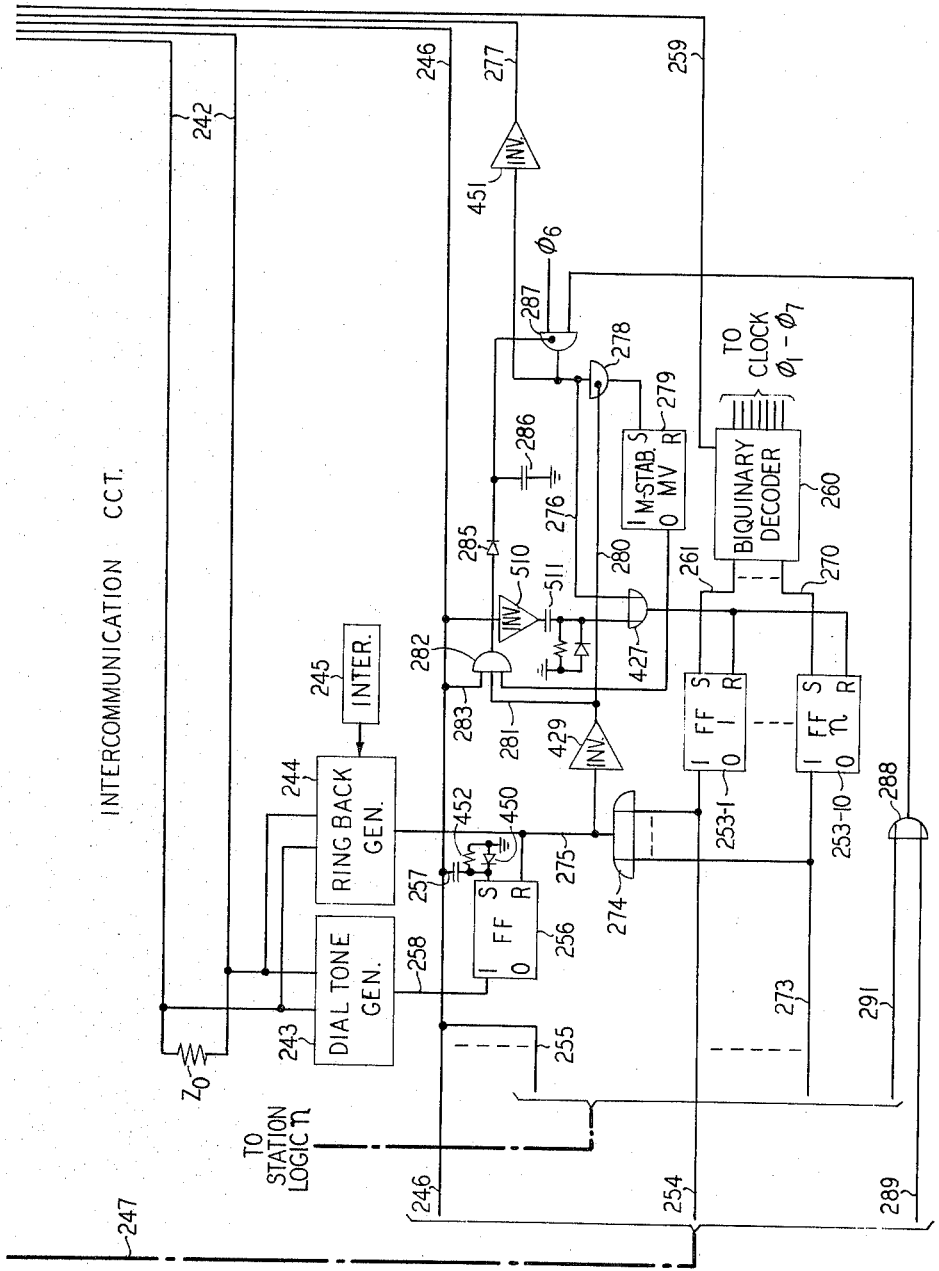
FIG. 7 shows an intercommunication circuit for selectively interconnecting the speech paths of the system's station sets, and for sending signals indicative of such a condition to the appropriate visual and audio indicators.

FIG. 7 illustrates the intercommunication control circuit which corresponds functionally to the system's line control circuits such as the one shown in FIG. 5. In other words, the intercommunication control circuit senses the condition of the intercommunication facility and transfers signals indicative of that condition to the visual and audible indicators of the appropriate station sets. As shown, the intercommunication control circuit comprises conductors 242 which originate in the intercommunication line circuit 160–$i$ (FIG. 4) in the same manner as the conductors of outgoing line No. 1 originate in line circuit 160–1, but terminate in a matching impedance $Z_0$ rather than at a telephone central office or PBX. Bridged across line 242 in parallel with each other are a dial tone generator 243 and a ringback generator 244 which respectively supply dial tone to the receiver of a station set desiring to place a call over the intercommunication facility and supply ringback tone to that receiver during ringing of the called parties station set. As shown, ringback generator 244 is energized in part by an interrupter 245 which causes the ringback tone to be emitted at a distinctive rate.

The intercommunication control circuit also includes a conductor 246 which is connected to intercommunication line circuit 160–$i$ in the same manner as conductor 168 is connected to line circuit 160–1. Conductor 246 traverses the intercommunication control circuit and is connected by a cable 247, conductor 248, inhibit gate 249, conductor 79, inhibit gate 72 and OR gate 67 to transistor 61 to control the energization of lamp 39 which is associated with the intercommunication facility. The inhibitory input of inhibit gate 249 (FIG. 3) is connected by a conductor 250 to the output terminals of a coincidence gate 251 having a first input terminal emanating from an interrupter 252 and a second input terminal being connected through conductor 254 and cable 247 to one terminal of bistable multivibrator 253–1 (FIG. 7). In order to energize the intercommunication lamps 39 of the other station sets of the system having access to the intercommunication facility, conductor 246 is connected in multiple, for example by conductor 255, to the station control circuits associated with the other station sets of the system in the same manner that conductor 246 is connected to the station control circuit of FIG. 3. Conductor 246 is connected through differentiating circuit 257 and negative going pulse clipper 450 to the "S" terminal of bistable multivibrator 256, the "1" terminal of which is connected to activate dial tone generator 243 through lead 258.

Conductor 259, which is connected to the input terminal of a biquinary decoder 260, connects to the intercommunication line circuit 160-*i* (FIG. 4) in the same manner that conductor 175 of the line control circuit of FIG. 5 is connected to line circuit 160-1. Biquinary converter 260 is a device which accepts time division multiplex coded information and responsively generates an output pulse on one of a plurality of output leads in accordance with the coding of the input information. A biquinary converter of this type is shown in detail in FIG. 12, and will be discussed more thoroughly in connection with the converter-allotter of FIG. 8. As labeled, biquinary decoder 260 includes seven input leads in addition to conductor 259, which leads are respectively connected to the $\Phi 1$ through $\Phi 7$ output conductors of the clock circuit. The ten output leads of biquinary converter 260, shown as conductors 261 through 270, are respectively connected to the "S" terminals of bistable multivibrators 253-1 through 253-10, each of which is associated with a different station set having access to the intercommunication facility.

The "1" terminal of bistable multivibrator 253-1 is connected through conductor 254, cable 247, coincidence gate 251 and conductor 250 to the inhibitory input of terminal of OR gate 427, one input conductor of which set shown in FIG. 2 through conductor 79, inhibit gate 72, OR gate 67 and transistor 61. This same "1" terminal is also connected through conductor 254, cable 247, coincidence gate 271 and conductor 272 to OR gate 194 which controls tone ringer 37 of the FIG. 2 station set through conductor 76, inhibit gate 69, OR gate 64 and transistor 58. The "1" terminals of the other bistable multivibrators 253-2 to 253-10 are connected to the station control circuits of the other stations having access to the intercommunication facility, for example by conductor 273, in the same manner that the "1" terminal of bistable multivibrator 253-1 is connected to the station control circuit of FIG. 3. The "1" terminals of bistable multivibrators 253-1 through 253-10 are all connected through OR gate 274 and conductor 275 both to the "R" terminal of bistable multivibrator 256 and to the input terminal of ringback generator 244.

The "R" terminals of bistable multivibrators 253-1 through 253-10 are connected in multiple to the output termnila of OR gate 427, one input conductor of which is connected to conductor 246 through an inverter and the other input conductor of which is connected to the output terminal of inhibit gate 287. The output terminal of gate 287 also connects to conductor 277, which is functionally equivalent to conductor 124 of line circuit 160-1 (FIG. 4), and through inhibit gate 278 to the "S" terminal of monostable multivibrator 279. The inhibitory input to inhibit gate 278 comprises conductor 280 which is connected through logical inverter 429 to the output terminal of OR gate 274.

The output terminal of OR gate 274 is also connected via logical inverter 429 and lead 281 to a first input of coincidence gate 282, which has second and third inputs 283 and 284 which are connected respectively to conductor 246 and the "0" terminal of multivibrator 279. The output terminal of coincidence gate 282 is coupled through a diode 285 and a delaying capacitor 286 to the inhibitory input of inhibit gate 287. As shown, there are two input leads for inhibit gate 287, the first emanating from the rectifier $\Phi 6$, or intercommunication phase ouput conductor of the clock circuit, and the second emanating from the output terminal of OR gate 288. One input terminal to OR gate 288 via conductor 289, cable 247, conductor 290 and conductor 96 to the output terminal of service request recognition gate 87, and the other input conductors, for example conductor 291, are connected to the station control circuit of the other station sets having access to the intercommunication facility in the same manner that conductor 289 is connected to the station control circuit of FIG. 3.

FIG. 8 shows the system's dialing facility which comprises the converter-allotter 9 of FIG. 1. In FIG. 8 the converter portion of the unit is shown as a functional block 118, the detailed circuitry of which will be discussed below in connection with FIGS. 11 and 12. The allotter, which steers dialing information from a subscriber's station set to the converter, and then in the form of dial pulses, from the converter to the particular outgoing line over which the called subscriber desires to place his call, constitutes the remainder of FIG. 8. Included in the allotter are "converter request" bistable multivibrators 292-1 through 292-*m*, one for each outgoing line of the system, which sense that a subscriber desires to place a call over the outgoing line associated with one of the bistable multivibrators and request access to the converter.

As shown, the "S" terminal of multivibrator 292-1 is connected by conductor 223 to the output terminals of inhibit gate 199 of the line control circuit associated with outgoing line No. 1, and the "R" terminal is connected to line circuit 160-1 (FIG. 4) through OR gate 293-1, conductor 225, differentiator 213, inverter 212, and conductors 209 and 168. The "S" and "R" terminals of multivibrator 292-*m* are respectively connected to the line control circuit and line circuit 106-*m* associated with outgoing line No. *m* in the same manner as the "S" and "R" terminals of multivibrator 292-1 are connected to the line control circuit of FIG. 5 and line control circuit 160-1.

The "1" terminal of multivibartor 292-1 is connected through a coincidence gate 294-1 and OR gate 295 to the "R" terminal of bistable multivibrator 296, the "1" terminal of which is connected through coincidence gate 297 to a driven ring counter 298. The output terminal of coincidence gate 294-1 is also connected via conductor 300-1 to the second input lead of OR gate 293-1.

Ring counter 298, a device well known to those skilled in the art, comprises a plurality of stages activated in succession in which each stage emits an output signal during the period of its activation. As indicated by output conductors 298-1 through 298-*m*, which respectively serve as the second input conductors to coincidence gates 294-1 to 294-*m*, counter 298 includes a separate stage for each outgoing line of the system.

The output terminals of coincidence gates 294-1 through 294-*m* are also respectively connected to the "S" terminals of bistable multivibrators 301-1 through 301-*m*. As shown, the "1" terminal of bistable multivibrator 301-1 comprises conductor 226, which connects in the manner described above to the line control circuit associated with outgoing line No. 1. Correspondingly, the "1" terminal of multivibrator 301-*m* comprises conductor 226 which is connected to the line control circuit associated with outgoing line *m* in the same manner that conductor 226 is connected to the line control circuit of outgoing line No. 1. The "0" terminals of multivibrators 301-1 through 301-*m* are connected to OR gate 302, the output terminal of which is connected firstly to the "S" terminal of bistable multivibrator 296, secondly, as will be explained in connection with FIGS. 12 and 14, to the reset circuitry of converter 118. The "1" terminal of bistable multivibrator 296 is connected to the second input terminal of coincidence gate 297. Conductors 225 through 225-*m* are respectively connected through OR gates 303-1 through 303-*m* to the "R" terminals of bistable multivibrators 301-1 through 301-*m*, the second input terminals of OR gates 303-1 through 303-*m* being connected in multiple to the "converter idle" terminal 368 of converter 118. The converter idle terminal emits a positive response when the converter is not in use, that is to say, is available to receive input dialing information.

In the embodiment of the invention described herein, a single converter 118 serves to change coded dialing information into conventional dial pulses. As will be explained below, a station set desiring to place a call over an outgoing line is first connected to that line through the switching network (FIG. 5) and then may proceed to dial. Multiplex coded dialing information generated by a calling set is applied to input 178 of converter 118 by separate paths respectively associated with the particular outgoing line over which the call is being placed. For example, dialing information from a set placing the call over the outgoing line No. 1 is applied to the converter via conductor 175, coincidence gate 176 and OR gate 177, and dialing information from a set placing a call over outgoing line No. $m$ is applied to the converter via conductor 175–$m$, coincidence gate 176–$m$ and OR gate 177. While the inputs to the converter from OR gate 177 each carry coded dialing information originating from a pushbutton dial array of a station set, repertory dialing information from the K5 and K6 keys of the station sets is applied to the converter by conductors 117 through 117–$m$ which originate from the output terminals of the respective repertory recognition gate 115 of the various station control units (FIG. 3).

The converter portion of the dialing facility, shown diagrammatically in FIG. 8 as block 118, is illustrated in detail in FIGS. 11 and 12. As shown in FIG. 11, the converter comprises a biquinary decoder which accepts biquinary coded information from the pushbutton dialing array of a station set and emits an output pulse on one of ten output lines corresponding to the usual ten dialable digits, in accordance with the input coding. The decoder comprises seven coincidence gates 304 through 310, seven pulse stretchers 311 through 317 (each one being identical to pulse stretcher 101 of FIG. 3), ten concidence gates 318 through 327 and ten output blocking oscillators 328 through 337. Coincidence gates 304 through 310 are each energized by two input leads, the first comprising conductor 178, also shown in FIG. 8, and the second comprising a respective one of the $\Phi1$ through $\Phi7$ output conductors of the clock circuit.

Coincidence gates 304 through 310 respectively activate pulse stretchers 311 through 317, the output terminals of which are connected to one of seven bus bars 388 through 344. More specifically, the output terminals of multivibrators 311 and 312 are respectively connected to busses 343 and 344, and the output terminals of multivibrators 313 through 317 are respectively connected to busses 338 through 343. Each of coincidence gates 318 through 327 has two input leads which are connected in different combinations to the aforementioned busses. In particular, coincidence gates 318 through 322 have their first input terminals connected in common to bus 343, and their second input terminals respectively connected to busses 339, 338, 341, 340, and 342, likewise, coincidence gates 323 through 327 have first input terminals connected in common to bus 344 and their second input terminals respectively connected to busses 339, 338, 341, 340 and 342. The output terminals of coincidence gates 318 through 327 are respectively connected to activate output blocking oscillators 328 through 337. As labeled, the output blocking oscillators respectively represent the usual ten dial digits, one through zero, associated with the pushbutton dial array of a station set.

The output conductors of blocking oscillators 328 through 337 are respectively threaded from left to right through the rows of a magnetic core memory matrix which comprises ten horizontal rows, one for each possible dialed digit, and seven vertical columns, one for each of the digits in a conventional directory number. The conductors then join a common lead 345 which is connected to drive "Write Stepping Switch" 346. Stepping switch 346 comprises seven output terminals, $a$ through $g$, which are respectively threaded from top to bottom through the columns of the matrix, and while the $b$ through $g$ output conductors terminate at the bottom of the matrix in a common ground lead, the $a$ output conductor is extended through lead 347 to the input of the next-to-the-last stage of stepping switch 348.

The converter circuit of FIGS. 11 and 12 also includes a "Read Stepping Switch" 349 comprising seven output terminals, $h$ through $n$, which are respectively threaded through the columns of the matrix from bottom to top and join above the cores in a common ground connection. Conductor 350, which drives stepping switch 349, originates from the output terminal of the last stage of stepping switch 348. The output terminal of the last stage of stepping switch 348 is also connected to amplifier, differentiating circuit 363, diode 364 and conductor 365 to the input terminal of inhibit gate 362. Commencing from a common ground connection and threaded through the respective rows of the matrix from left to right are conductions 351 through 360 which are severally wound through the cores of the first ten stages of stepping switch 348, and then join in a common conductor 361 which is connected to the inhibitory input of inhibit gate 362. The output terminal of inhibit gate 362 is connected, as will be explained, to reset the stepping switches 346 and 349 and is also threaded through each core of the matrix, although for simplicity not shown as such, so as to completely reset the memory.

The output circuits of the first ten stages of stepping switch 348 comprise ten parallel conductors which commence at a common ground lead, are severally threaded through the cores of the first ten stages, and join in a common conductor 500. The dial pulse output from the converter is derived from a pulse generator, or monostable multivibrator 374, which is driven by conductor 505 and applies output pulses to conductor 366 which is designated in FIG. 8 as the output conductor of the converter. Conductor 366 is also connected to energize the pulse stretcher, or "time-out" circuit 367 (similar to pulse stretcher 101 of FIG. 3 by having a considerably greater time constant) which in turn has its output terminals connected to conductor 368. As shown in FIG. 8 conductor 366 is connected in multiple to coincidence gates 369–1 through 369–$m$, the output terminals of which are respectively connected to conductors 227 through 227–$m$. The second input terminals to coincidence gates 369–1 through 369–$m$ respectively originate from the "1" terminals of multivibrators 301–1 through 301–$m$. Conductor 368, which constitutes the "converter idle" conductor signifying that the converter is free to receive multiplex coded dialing information, is connected in multiple by OR gates 303–1 through 303–$m$ to the R terminals of multivibrators 301–1 through 301–$m$.

Also shown in FIGS. 11 and 12 is the repertory dialing portion of the converter, that is to say, the circuitry which transforms coded pulses generated by the K5 and K6 keys of a station set into a series of dial pulses which represent predetermined stored directory numbers. The input circuitry for this portion of the converter comprises coincidence gates 370 and 371 which are respectively connected to blocking oscillators 372 and 373 through individual pulse stretchers 506 and 507 which are similar to pulse stretchers 311 through 317. The first input terminals of coincidence gates 370 and 371 are respectively connected to the $\Phi7$ and $\Phi8$ output conductors of the clock circuit, and the second input terminals are connected in multiple through conductor 423 and OR gate 375 to conductors 117 through 117–$n$ (FIG. 8), which are in turn respectively connected to the output terminals of repertory recognition gates 115 through 115–$n$ (FIG. 3) of the various station control units of the system. The output conductors of blocking oscillators 372 and 373 each fork into as many separate wires as there are station sets having repertory selections. In the embodiment described herein, two groups of four separate wires each are shown, 372–1 through 372–4 and 373–1 through 373–4, respectively, which are individually threaded through the matrix in accordance with the several stored directory numbers. For example, wire 372–1 is shown threaded through the matrix in a pattern which represents the directory number 875-8624. While the other wires are not specifically shown, in an actual system they are threaded through the matrix in a predetemined manner to represent other frequently called directory numbers.

When the aforementioned threaded wires emerge from the matrix they are collectively wound around the core of the fourteenth stage of stepping switch 348, and then the −1, −2, −3 and −4 wires of the forked conductors are segregated and connected into four separate groups which in turn are respectively connected to coincidence gates 376 through 379. The second input terminals to coincidence gates 376 through 379 are severally connected to conductors 117 through 117–n, and the output conductors of these coincidence gates are connected to ground. Although the repertory portion of the converter is shown as having only eight possible repertory selections, it should be obvious to one skilled in the art that the number of repertory selections may be easily increased by merely assigning another key and another output clock phase to the repertory dialing function, and providing additional coincidence gates, blocking oscillators, and wires threaded through the matrix.

FIG. 14 shows an illustrative embodiment of a stepping switch which may be used as stepping switches 346 and 349 of FIG. 12. As shown, the switch comprises a driving section including an input lead 380 (corresponding to leads 345 and 350 of stepping switches 346 and 349, respectively) which is threaded in series through a pair of driver cores 381 and 382, and then connected to ground. The output section of the stepping switch comprises seven cores, 386 through 392, one for each column of the matrix. Core 381 drives output cores 386, 388, 390 and 392 via blocking oscillator 393 which is pulsed by winding 394 of core 381. Similarly, core 382 drives output cores 387, 389 and 391 via blocking oscillator 399 which is pulsed by winding 400 of core 382. The output lead of blocking oscillator 393 is also connected to windings 383 and 384 of cores 381 and 382, respectively, and likewise, the output of lead blocking oscillator 399 is connected to windings 421 and 422 of cores 381 and 382, respectively.

As shown, output conductor $a$ of write stepping switch 346 (or $h$ of read stepping switch 349) is connected to ground through two series windings 404 and 405, the first of which links core 386 and the second of which links core 387. Similarly, output conductors $b$, $c$, $d$, $e$ and $f$ (or $i$, $j$, $k$, $l$ and $m$) are each connected to ground through two series windings, the first linking cores 388 and 387, the second linking cores 388 and 389, the third linking cores 390 and 389, the fourth linking cores 390 and 391, and the fifth linking cores 392 and 391. The $g$ (or $n$) output conductor of the stepping switch is coupled to ground through winding 416 which links only core 392. A reset blocking oscillator 417 is provided having its output terminal serially threaded through each of the cores in the stepping switch and through each of the cores in the matrix so as to reset the entire magnetic structure of the converter. Stepping switch 348 (FIG. 12) includes a driving section 418 which is similar to the driving section of the stepping switch shown in FIG. 14, one of the driving blocking oscillators energizing the right-hand column of cores and the other blocking oscillators driving the left-hand column.

The manner in which the invention operates to provide each of the various subscriber services available at a station set will now be described.

*Seizure of outgoing line No. 1*

When a subscriber desires to place a call over outgoing line No. 1, he first removes his handset 23 from its cradle which effects closure of switchhook contacts 24 in a well-known manner. Accordingly, a direct-current path is established through the tip and ring conductors of the line, and the resulting potential difference induced across resistor switches transistor 78 to a state of conduction. In response, positive potential is applied through transistor 78 and conductors 90 and 89 to coincidence gate 120, inverter 107 and inhibit gate 141. In order to seize outgoing line No. 1, the subscriber depresses station key K1 which, as labeled, is associated with outgoing line No. 1. When the Φ4 service request pulse from the distributor appears on conductor 27, this pulse, being negative in polarity, is transferred through diode 31 and closed contacts 25 and 26 of key K1 to return signaling lead 30. Being of opposite polarity, the Φ3 service request pulse which appeared on conductor 27 shortly before the Φ4 pulse, is rejected by diode 31. The Φ4 service request pulse on return signaling lead 30, after rectification, is applied to gate 80 in coincidence with the companion Φ4 pulse from the clock circuit which is applied via conductor 81. Accordingly, a pulse coincident with the Φ4 pulse is passed through coincidence gate 80 to energize one input terminal of service request recognition gate 87. Since the station set is in off-hook condition, the other input terminal to gate 87 is energized by positive source through transistor 78. Thus, as will be explained below, the pulse applied to gate 87 via coincidence gate 80 is passed to both station circuit 125–1 and line circuit 160–1 of the switching network. These are the circuits of the switching network associated with the station set requesting service and the line to which that set desires connection.

More specifically, one input terminal of coincidence gate 92 is energized with the Φ4 service request pulse via conductor 91, while the other input terminal is energized with a coincident pulse via conductor 93 and OR gate 94. Accordingly, the Φ4 pulse is passed to the anode of crosspoint 146 by conductor 95, differentiating circuit 149, diode 150, and capacitor 151. This pulse is of sufficient magnitude to breakdown crosspoint 146 and, as a result, apply a positive potential to the anodes of crosspoints 126, 127 and 128 through conductor 147, 133, the parallel path comprising as one branch resistor 139, diode 138, transistor 137 and diode 136, and as the other branch shaping circuit 132 and diode 131, the conductor 130, winding of transformer 76 and conductor 129. Due to the magnitude of the positive potential 144 and the impedance of the path just described, however, this pulse alone applied to the anodes of crosspoints 126 through 128 is not sufficient in magnitude to force these elements into conduction.

The Φ4 service request pulse from coincidence gate 87 is also applied via conductor 96 and cable 192 to all line control circuits associated with outgoing lines to which the station set of FIG. 2 has access. As shown, the Φ4 service request pulse is applied to one input terminal of coincidence circuit 123 (FIG. 5) through conductor 120, OR gate 121 and conductor 122. The other input signal to coincidence gate 123, as shown, is a pulse from the clock circuit which corresponds in time to the particular outgoing line with which gate 23 is associated, in this example the Φ4 pulse which signifies outgoing line No. 1. Accordingly, the Φ4 service request pulse, after inversion by inverter 420, is applied to the cathodes of crosspoints 126 of all station circuits 125–1 of stations having access to outgoing line No. 1 through conductor 124, resistor 181 and diode 161. Thus, coincidence is established between a positive pulse at the anode and a negative pulse at the cathode of only that crosspoint 126 linking the station set of FIG. 2 with outgoing line No. 1. This combination of positive and negative pulses creates a sufficient potential difference to breakdown crosspoint 126, thereby establishing a transmission path between the station set of FIG. 2 and outgoing line No. 1. It will be observed that OR gate 121 comprises input terminals connected to the station control circuits of all other stations having access to outgoing line No. 1 in the same manner and for the same purpose that conductor 120 is connected to the station control circuit of FIG. 4.

After the aforementioned coincident positive and negative pulses subside, crosspoints 146 and 126 are maintained in their conducting states by positive source 144 which supplies sufficient current through diode 145, crosspoint 146, conductors 147 and 133, the parallel paths comprising shaping circuit 132 in one branch and transistor 137 in the other, conductors 130 and 129, crosspoint 126, conductor 159, diode 161, the primary winding of transformer 162 and varistor 163, to hold the crosspoints in conduction. The holding current from source 144 also provides sufficient current to turn on transistors 165 and 166. When transistor 165 conducts, a positive going potential appears on conductor 168, which signal will hereinafter be designated "line memory" because it signifies that a transmission path has been established through the switching network between a station set and an outgoing line. This positive going potential is applied through junction 207, conductor 236, slow release circuit 237, and OR gate 238, to one input terminal of inhibit gate 205. As will be explained below in connection with the system dialing facility, when the converter 118 (FIG. 8) is free and ready to accept dialing information from the station set, an "enable dialing" signal is emitted and energizes the other input lead of inhibit gate 205 via conductor 226, OR gate 203 and bistable multivibrator 204. When both input leads of gate 205 are energized, line seizing relay 206 operates to close make contacts 164, and thereby cause dial tone from the telephone central office or PBX to be applied to the subscriber's receiver through the switching network. Thus, upon line selection, the line will not be seized until the dialing facility is prepared to accept coded dial signals.

The line memory pulse on conductor 168 is also applied through junction 207, conductors 209, and 231, OR gate 228 and conductor 77 to inhibit gate 70, which in turn transfers signals on alternate half cycles of free running multivibrator 73 through OR gate 65 to the base of transistor 59. In response, transistor 59 applies a signal through conductor 27 and diode 31 to energize lamp 38, thereby indicating to the subscriber that outgoing line No. 1 has been seized. The other output conductors of OR gate 228, for example conductor 424, activate corresponding lamps of all other station sets having access to outgoing line No. 1. The lamp activating signal on conductor 27, owing to its relative polarity, will not be passed by diode 32, and therefore will not energize tone ringer 37. It is to be noted that in an actual system of this type the service request pulses are approximately 150 microseconds in duration, and appear repetitively once every 25 milliseconds. Therefore, even though the service request pulses are continuously applied to the various lamps and tone ringers of the station sets they do not provide sufficient energy to activate these indicators.

Since input signaling leads 27 and 28 supply energy to keys K1 through K4 as well as to indicators 37 through 40, it is possible that the indicator activating pulses (waveforms V and VI of FIG. 10) could be transferred to return signaling lead 30 as service request pulses through the keys. For example, when transistor 59 is energized by multivibrator 73, thus signifying that outgoing line No. 1 has been seized, the subscriber may not have yet released K1. Consequently, the indicator activating pulses appearing on conductor 27 will be passed through diode 31 and key K1 to the return signaling lead, possibly in coincidence with one of the other service request pulses. The portion of the indicator activating pulse in coincidence with another service request pulse, for example, the Φ5 service request pulse, would be passed by return signaling lead 30, full wave rectifier 78, and coincidence gates 80 and 87 to coincidence gate 92. The Φ5 service request pulse would also be applied to coincidence gate 92 through OR gate 94 and conductor 93. Thus, to the station control circuit this signal would appear as a genuine subscriber request to seize outgoing line No. 2, when actually it is only a portion of the indicator activating signal which has been spuriously transferred to the return signaling lead. To prevent such an occurrence, inhibit gates 69 through 72 inhibit the indicator activating pulses during the occurrence of the all service request pulses. Consequently, the indicator activating pulses are not present during the occurrence of the service request pulses, and therefore cannot be applied to the station control circuitry via return signaling lead 30 in coincidence with signals applied to gate 80 by the clock circuit.

Seizure of outgoing line No. 2

If a subscriber desires to place a call over outgoing line No. 2, he depresses key K4, and thereby enables service request pulse Φ5 to be transferred from input signaling lead 28 through diode 34 and the closed contacts 25 and 26 of K4 to return signaling lead 30. In the same manner as described with respect to seizure of outgoing line No. 1, a positive pulse is applied to the anodes of crosspoints 126, 127, and 128 associated with station circuit 125–1 of the switching network. Also, as previously noted, a pulse is transferred to all line control circuits of the system to which this set has access through coincidence gate 87, conductors 91 and 96, and cable 192. Thus, a negative going pulse is applied to the cathode of crosspoint 128, which connects to outgoing line No. 2, in the same manner in which a negative going pulse was applied to the cathode of crosspoint 126 when it was desired to place a call over outgoing line No. 1. Accordingly, crosspoint 128 is switched into conduction and provides a transmission path from the particular station set of FIG. 2 to outgoing line No. 2. Also, the line control circuitry associated with outgoing line No. 2 (not shown, but similar to the arrangement of FIG. 5), functions both to seize outgoing line No. 2 by a pair of make contacts similar to make contacts 164 and also to activate lamp 40 of all station sets having access to outgoing line No. 2.

Dialing over an outgoing line

Before a subscriber can dial a directory number, in fact before he even seizes an outgoing line, he must first acquire access for his station set to the converter. This is accomplished automatically in the following manner. It will be recalled that when a transmission path is established between a station set and an outgoing line through one of the crosspoints 126, 127 or 128, a "line memory" signal appears on the conductor 168 associated with the particular line over which the call is to proceed. The leading edge of this positive going signal is differentiated by circuit 208 and then applied by conductor 222, inhibit gate 199, and conductor 223 to the "S" lead of bistable multivibrator 292–1 (FIG. 8) to initiate a request for access to the converter.

Since an outgoing line will be seized both when an outgoing call is initiated as well as when a subscriber answers an incoming call, means are provided for distinguishing between these two types of seizures and preventing requests for access to the converter upon the latter. More specifically, upon occurrence of an incoming call, the 20 cycle ringing signal appearing on the line activates ringing detector 184, which in turn activates bistable multivibrator 188 through differentiation circuit 187. When the called subscriber lifts his handset and depresses the key associated with the line on which the call is arriving, the line is seized, as previously described, and a pulse applied to inhibit gate 199 via conductor 222. However, this pulse is inhibited by gate 199 due to the presence of the signal at the inhibitory input of this gate from bistable multivibrator 188. Although multivibrator 188 is reset when the line is seized, delay circuit 198 continues to maintain a positive signal at the inhibitory input to gate 199 until after the differentiated pulse on conductor 222 has subsided.

It will be assumed initially that when a "converter request" pulse appears on conductor 223 (FIG. 8) the converter is free, that is to say, not engaged in processing dialing information for any other station. Consequently, as will be explained in detail below, the "converter idle" lead (conductor 368 of FIG. 8) is activated and applies a positive signal through OR gate 303–1 to the "R" lead of bistable multivibrator 301–1. The "0" terminal of bistable multivibrator 301–1 applies a positive signal through OR gate 302 to the "S" terminal of bistable multivibrator 296, the "1" terminal of which responsively applies a positive signal to coincidence gate 297. Consequently, output leads 298–1 through 298–m are activated in succession owing to driving pulses from free running pulse generator 299 being applied through coincidence gate 297 to the input terminal ring counter 298.

After bistable multivibrator 292–1 has been activated by a "converter request" pulse from conductor 223, the first pulse appearing on conductor 298–1 is passed by coincidence gate 294–1 and coupled firstly by conductor 300–1 and OR gate 293–1 to the "R" terminal of bistable multivibrator 292–1 to reset multivibrator 292–1, secondly, through OR gate 295 to reset bistable multivibrator 296 and thereby deactivate coincidence gate 297, and thirdly, to the "S" terminal of bistable multivibrator 301–1. A positive going signal is emitted from the "1" terminal of bistable multivibrator 301–1 and is applied via enable dialing conductor 226 and OR gate 203 (FIG. 5) to the "S" terminal of bistable multivibrator 204. As explained above, this results in coincidence gate 205 being energized to permit operation of line seizing relay 206, thereby closing make contacts 164 and permitting the application of dial tone from the telephone central office through the switching network to the subscriber's handset. If a subscriber wishes to dial over a different outgoing line, for example, outgoing line No. m, the line control circuit associated with the outgoing line m (not shown) operates in exactly the same manner as the line control circuit shown in FIG. 5, and in the allotter the elements associated with outgoing line No. m operate rather than the elements associated with outgoing line No. 1.

After the subscribed hears dial tone in his receiver, he proceeds to dial by depressing the various pushbuttons 5 of his dialing array. As shown in FIG. 2, each pushbutton is mechanically linked to two of the switches 43 through 49. Counsequently, each time a pushbutton of the dialing array is depressed, two separate service request pulses are transferred from the distributor through the closed pair of switches to return dialing lead 55. For example, if the pushbutton representing digit 8 is depressed, switch 44 and 47 are closed. As a result, the Φ2 service request pulse generated by transistor 57 is transferred by conductor 50, diode 53, conductor 52 and the closed contacts of switch 44 to return dialing lead 55. Similarly, the Φ6 service request pulse generated by transistor 61 is transferred by conductor 28, diode 33 and the closed contact of switch 47 to return dialing lead 55. These two pulses uniquely represent the dialed digit 8, and as is readily apparent from the mechanical linkage of the other pushbuttons, unique pairs of pulses likewise represent the other dial digits.

The service request pulses on return dialing lead 55, which in this instance represent dialing information rather than subscriber service requests, are rectified by full wave rectifier 82, transferred through gate 84 in coincidence with appropriate companion clock pulses appearing on conductor 85, are further transferred through coincidence gate 120 which is energized through transistor 78 and conductors 90 and 89 by virtue of handset 23 being off hook, and are eventually applied via conductor 121 to the inhibitory input of inhibit gate 141. As a result, transistor 137 is momentarily turned off during the presence of these pulses, thereby increasing the impedance of the path through which positive source 144 applies current to the base of transistor 166. This increase in impedance results in base current variation to transistor 166, which results in emitter voltage variations corresponding in time to the clock phases of the digit-representing pulses. These multiplex coded dial information signals produce corresponding signals at the collector of transistor 166 which in turn are applied by conductor 175 to one input terminal of coincidence gate 176 (FIG. 8). The other input terminal to which is energized by the "1" terminal of bistable multivibrator 301–1 (the source for enable dialing lead 226). Accordingly, these signals are passed through gate 176 and then are further transferred through OR gate 177 to input lead 178 of the converter 118.

When the multiplex coded signals on conductor 178 emerge as conventional dial pulses from the converter on conductor 366, as will be explained below, they are steered by coincidence gates 369 through 369–m to the proper "dial pulse" conductor 237 through 227–m associated with the outgoing line over which the subscriber desired to dial. Since the subscriber in this instance is placing his call over outgoing line No. 1, the "1" terminal of bistable multivibrator 301–1 (associated with outgoing line No. 1) is positive, and therefore enables coincidence gate 369. Consequently, the dial pulses on conductor 366 are transferred through coincidence gate 369 and are applied by conductor 227 to the inhibitory input of inhibit gate 205. These pulses function to release line seizing relay 206, which in turn momentarily opens make contact 164 so as to interrupt the central office direct current flowing through outgoing line No. 1. Thus, the dial pulses from the converter are transferred to the central office in the form of interrupted direct-current pulses, which is the conventional manner in which such information is relayed to a telephone office.

The manner in which coded dial signals from a station set are converted to conventional dial pulses will now be described with reference to FIGS. 11 and 12. As previously mentioned, coded pulses generated by the pushbutton dialing array of a station set enter the converter via conductor 178, are applied simultaneously to coincidence gates 304 through 310, and are passed through appropriate ones of these gates in coincidence with their corresponding clock phases. For example, when the digit 8 pushbutton is depressed, the Φ2 and Φ6 pulses are successively applied by conductor 178 to each coincidence gate 304 through 310. The Φ2 pulse passes through gate 305 in coincidence with the Φ2 pulse from the clock circuit, and similarly, the Φ6 pulse passes through gate 309 in coincidence with the Φ6 pulse from the clock circuit.

From gates 305 and 309, the coincidence gates in the example given above, these pulses are respectively applied to, and activate, selected ones of pulse stretchers 311 through 317. Pulse stretchers 311 through 317 are identical in construction to pulse stretcher 101 of FIG. 3, and their operation will now be described with reference to that figure. In the absence of a positive input signal, transistor 500 resides in nonconducting state, thereby allowing capacitor 501 to charge sufficiently through resistor 504 to breakdown Zener diode 503. Consequently transistor 502, during this period, is conducting and the potential at the collector-electrode of that transistor, which serves as the output terminal of the pulse stretcher, is approximately ground. When a positive pulse is applied to input conductor 104 of transistor 500, capacitor 501 rapidly discharges and renders Zener diode 503 nonconducing. As a result, transistor 502 ceases conducting which raises the potential on the output terminal of the pulse stretcher to that of positive battery. When the input pulse is removed from conductor 104, thereby rendering transistor 500 nonconducting, capacitor 501 once again commences to charge, and, if no further positive pulses are applied, to input conductor 104, will begin reverse conduction after a period of time determined by the parameter of the charging circuit. At that time transistor 502 begins to conduct, thus removing the positive signal from the output conductor of the pulse stretcher. In the particular embodiment of the invention described herein, the time constant of the charging circuit, that is the time interval required to charge capacitor 501 sufficiently to break down Zener diode 503, is slightly greater than one frame length of the service request pulses. Accordingly, although the pair of pulse stretchers representing a particular digit are not activated simultaneously, nevertheless, there will during some interval of the multiplex frame be coincidence of the output signals of these pulse stretchers. Thus, even though the Φ2 pulse activates pulse stretcher 312 before the Φ6 pulse activates pulse stretcher 316, there will be an interval during which both pulse stretchers provide output signals.

This concurrence of output signals is recognized by the appropriate one of coincidence gates 318 through 327, each of which is connected to a pair of buses 338 through 344 so as to detect a different digit. For example, coincidence gate 325 has its input terminals connected to busses 334 and 341, which busses are activated concurrently when the digit 8 pushbutton of the station sets dialing array is depressed. In a like manner the others of coincidence gates 318 through 327 recognize other dialed digits and in response severally energize output blocking oscillators 328 through 337. These output blocking oscillators are the pulse sources by which dialing information is inserted into the matrix of FIG. 12 preparatory to conversion of this information into conventional dial pulses.

The digit-representing pulses from output blocking oscillators 328 through 337 are translated through the matrix by rows, each blocking oscillator energizing a different row, and then applied by a common conductor 345 to the input terminal of write stepping switch 346. Substantially simultaneously with the application of the first input pulse from the blocking oscillators, output terminal *a* of stepping switch 346 applies a pulse through the cores of the first column of the matrix. The stepping switch 346 is designed to act sufficiently fast so that when its output terminals apply a pulse to a column of the matrix, pulses applied to the rows of the matrix have not yet subsided. The cores are threaded in such manner that the coincidence at one of the first column's cores of current surges from both a blocking oscillator and an output terminal of the write stepping switch creates a magnetic field operative to switch the core into a different state of magnetization, thereby storing dialing information in the first column of the matrix. As will be explained in connection with FIG. 14, the output terminals *a* through *g* of write stepping switch 346 operate in succession upon the appearance of succeeding pulses from blocking oscillators 328 through 337 so that information representing successive dial digits are stored in succeeding columns of the matrix in substantially the same manner as dialing information is stored in the first column.

In addition to provide flux for storing dialing information in the first column of the matrix, output terminal *a* of the write stepping switch initiates readout of the matrix by applying a pulse through conductor 347 to the core of the next-to-the-last, or fourteenth stage of output stepping switch 348. More particularly, when output terminal *a* of the write stepping switch transfers a core of the first column of the matrix to the "1" state, it also, via conductor 347, switches the core in the fourteenth stage of the output stepping switch to the "1" state. Free running driver 418 of the output stepping switch shifts this stored pulse first to the fifteenth stage and then out to conductor 350 by which it is applied as an input pulse to read stepping switch 349. In response, the read stepping switch emits a pulse from output terminal *h* which drives the core of the first column in which dialing information was stored back to its initial "0" state. The aforementioned core in being switched from the "1" to the "0" state induces a signal in the appropriate one of output conductors 351 through 360 which drives a corresponding core in output stepping switch 348 to the "1" state. Thereafter, each pulse from driver 418 shifts this stored information to a succeeding stage of stepping switch 348, and upon so doing induces a series of pulses on conductor 505. Accordingly, dial pulse generator 365 generates a corresponding series of pulses which are applied to conductor 366. Thus, if the digit 8 pushbutton of a station set is depressed, a pulse is applied by matrix output conductor 353 to the core of the third stage of stepping switch 348, and drives this core to the "1" state.

As this pulse is shifted from stage to stage between the third and the eleventh stages, common conductor 505, and hence dial pulse generator 365, is energized eight successive times, which results in the application of eight dial pulses to an outgoing line of the system. The pulse in stepping switch 348 continues to be shifted from stage to stage until it is shifted from the fifteenth, or last stage, and is applied to read stepping switch 349 by conductor 350 to once again activate read stepping switch 349, whereupon dial information stored in the next column of the matrix is transferred to the output stepping switch.

When all of the dial information stored in the matrix has been transferred to output stepping switch 348 and converted to dial pulses, a reset pulse is applied to each of the cores of the matrix as well as the cores of stepping switches 346 and 349, so as to drive cores to their initial "0" state in readiness to receive dialing information from another station set. More specifically, as shown in FIG. 12 the output lead of the last stage of output stepping switch 348 is coupled not only to the input to read stepping switch 349 by conductor 350, but is also coupled to the input of inhibit gate 362 by an amplifier, differentiating circuit 363, positive pulse clipper 364 and conductor 365. The inhibitory input to gate 362 is connected to resistor 420 which is energized through common conductor 361 by matrix output conductors 351 through 360. The output terminal of inhibit gate 362 is connected to reset blocking oscillator 417 (FIG. 14) which when pulsed resets the entire magnetic structure of the converter.

When a pulse is emitted from the last stage of output stepping switch 348, the differentiated trailing edge of this pulse is applied to the inhibit gate 362 by conductor 365. At the same time, provided that dialing information is stored in the matrix, read stepping switch 349 is energized by conductor 350, which results in a pulse being applied to the inhibitory input of gate 362 by conductor 361. Accordingly, pulses applied to output stepping switch 348 will, upon being shifted from the last state of that switch, reset the converter through inhibit gate 362 unless there is further dialing information stored in the matrix to energize the inhibitory input of gate 362.

It will be observed that the storage of dialing information and the subsequent readout and conversion of this information into dial pulses occur at different rates, the former being under the control of the dialing subscriber, while the latter occurs at a rate determined by the operating frequency of free running driver 418. As a result, the readout of dialing information frequently overtakes the storage of this information. It may occur, for example, that a subscriber hesitates between dialing successive digits, in which case information associated with the last digit dialed may be transferred to stepping switch 348 before the subscriber resumes dialing. In such an event, the matrix will be reset when the last dialing information stored is transferred out of stepping switch 348 and no further dialing information is present in the matrix to inhibit the passage of a reset signal through gate 362. However, when the subscriber resumes dialing, the next digit dialed is stored in the first column of the matrix and is converted to dial pulses in exactly the same manner as if it were the first digit dialed. In other words, even though readout of dialing information may occur at a faster rate than readin, conversion nevertheless continues on as soon as more dialing information is stored in the matrix.

With reference to FIG. 14, the operation of read and write stepping switches 346 and 349 will now be explained. Initially, as determined by the windings serially connected to the output terminal of reset blocking oscillator 417, core 386 is set in the "1" state, cores 387 through 392 are set in the "0" state, core 381 is set in the "1" state, and core 382 in the "0" state. Also, the windings of the aforementioned cores are threaded such that positive going input pulses applied to the cores both by input lead 380 and by blocking oscillators 393 and 399 tend to drive the cores from the "1" to the "0" state. Accordingly, the first input pulse appearing on lead 380 changes core 381 from its initial "1" state to the "0" state, but has no effect on core 382, this core already being in the "0" state. When core 381 changes state, a voltage is induced in winding 394 which activates blocking oscillator 393. Blocking oscillator 393 then fires and a pulse is applied to windings 392, 390, 397 and 398 of cores 395, 390, 388 and 386, respectively, switching the last mentioned core from the "1" to the "0" state, but having no effect on the first three mentioned cores which are initially in the "0" state. As core 386 switches from its initial "1" state to the "0" state, a signal is induced in winding 404 which, by means of winding 405, switches core 387 to the "1" state, and also provides an output pulse to the $a$ ($h$) output terminal of the stepping switch. In addition, the output pulse of blocking oscillator 393, which is longer in duration than the input pulse on lead 380, is coupled back to windings 383 and 384 so as to leave core 381 in the "0" state but switches core 382 to the "1" state.

The next pulse applied to the stepping switch by lead 380 has no effect on core 381 since this core is now in the "0" state, but switches core 382 from its previously acquired "1" state back to the "0" state, and in so doing induces a signal in winding 400 which in turn activates blocking oscillator 399. The output pulse from blocking oscillator 399, which is applied to windings 403, 389 and 401 switches core 387 from its newly acquired "1" state back to the "0" state, but has no effect on cores 389 and 391 which are already in the "0" state. In switching from the "1" back to the "0" state, core 387 induces a signal in transfer winding 407 which both switches core 388 from its orignal "0" state to the "1" state, and appears as an output pulse on the $b$ ($i$) output lead. The pulse from blocking oscillator 399 is also applied to windings 421 and 422 which leave winding 382 undisturbed in the "0" state but drive core 381 back to the "1" state. This process repeats itself, that is to say, the remaining output terminals of the stepping switch are energized in succession, until either all of the terminals have been energized or the stepping switch is reset by blocking oscillator 417. It will be observed that the output conductor of blocking oscillator 417, after being threaded through each core of the stepping switch shown in FIG. 14, is also threaded through the cores of the matrix and the cores of the other stepping switch so as to reset the entire converter.

*Repertory dialing selection*

FIG. 2 shows a station set as having two repertory dialing selections which are respectively associated keys K5 and K6. If the subscriber desires to select the directory number associated with key K5, he depresses that key thereby allowing the Φ7 service request pulse to be transferred from input signaling lead 29, through diode 36 and closed contacts 25 and 26 of key K5, to return signaling lead 30. This pulse is then passed through full wave rectifier 78, through gate 80 in coincidence with the Φ7 pulse from the clock, through gate 87, and appears on conductor 96. From conductor 96 the Φ7 pulse is applied firstly by conductor 114 to gate 115 through which it is passed in coincidence with the Φ7 pulse from OR gate 116, and then by conductor 117 to converter 118 (FIG. 8). It will be noted that this pulse is neither passed through gate 92 because it is not coincidence with the Φ4, Φ5 or Φ6 pulses on conductor 93, nor hold gate 98 because it is not in coincidence with the Φ3 pulse.

In FIG. 12 provision is made for eight repertory dialing selections, of which only the directory number associated with conductor 372–1 is indicated. When the pulse on conductor 117 enters the converter (FIG. 12), it is applied to first input terminals of coincidence gates 370 and 371 through OR gate 375 and conductor 423, and concurrently to the first input terminal of coincidence gate 376. Since this pulse on conductor 117 is in coincidence with the Φ7 pulse from the clock, a pulse is emitted from gate 370 which is applied to the second input terminals of coincidence gates 376 through 379 through pulse stretcher 506, blocking oscillator 372 and conductors 372–1 through 372–4. Consequently, a current path is completed through conductor 372–1, thereby storing in the matrix the directory number associated with that conductor.

After conductors 372–1 through 4 and 373–1 through 4 emerge from the matrix, but before their connection to coincidence gates 376 through 379, they are threaded through the core of the fourteenth stage of output stepping switch 348. Accordingly, when any of the aforementioned conductors is energized, the fourteenth stage of output stepping switch 348 is switched to the "1" state. This information is shifted by driver 418 to the fifteenth, or last stage, and then to conductor 350 to activate read stepping switch 349. Thus, readout of a repertory number from the matrix is initiated and proceeds in the same manner as readout of directory numbers stored by pushbutton dialing.

*Receipt of an incoming call*

When a call arrives on one of the lines of the system, for example outgoing line No. 1, detector 184 senses the 20-cycle voltage of the ringing signal and applies a step impulse to conductor 185. This step is differentiated by circuit 187 and applied as a positive going signal to the "S" terminal of bistable multivibrator 188. In response, a positive going signal is generated from the "1" terminal of bistable multivibrator 188 and fed back by conductor 186 to maintain a continuous signal on conductor 185 even though the ringing signal subsides. As shown, the "1" terminal of multivibrator 188 is also coupled through conductor 189, coincidence gate 190, conductor 191, cable 192, and conductor 193 (FIG. 3) to OR gate 194. The output terminal of coincidence gate 190 is connected in multiple, for example by conductor 195, to the station control circuits of other stations connectable to outgoing line No. 1 in the same manner that the line control circuit of FIG. 5 is connected to the station control circuit of FIG. 3. The output terminal of OR gate 194 is connected to the base of transistor 58 through conductor 76, inhibit gate 69, and OR gate 64 to energize tone sounder 37 through input signal lead 27 and diode 32. The second input terminal to coincidence gate 190 is coupled to the output of an interrupter, or free running multivibrator 196, which determines the ringing period of tone ringer 37. The "1" terminal of multivibrator 188 is also connected through coincidence gate 230, OR gate 228, conductor 77, inhibit gate 70, and OR gate 65, to the base of transistor 59, to energize lamp 38 through input signaling lead 27 and diode 31. The second input terminal to coincidence gate 230 is coupled to flash interrupter, or free running multivibrator 234 which causes lamp 38 to flash at a distinctive rate. The output conductor of OR gate 228 is connected, for example by conductor 424, to energize the lamps 38 associated with other station sets of the system which have access to outgoing line No. 1. Thus when an incoming call arrives, an audible tone is emitted and an appropriate lamp is flashed at all stations having access to the line on which the call is arriving.

The called suscriber, observing by the flashing lamp that a call is arriving over a particular outgoing line, lifts his handset 23 from its cradle and depresses the particular one of keys 4 associated with the active line. As previously described, this action establishes a transmission path through the switching network of FIG. 4 from the answering station set to the line upon which the call is arriving. Thereafter, a positive going signal arises on "line memory" conductor 168 (FIG. 5) and is applied through junction 207 and differentiating circuit 208 to reset monostable multivibrator 188 which releases ringing detector 184. The resetting of bistable multivibrator 188 also removes an enabling signal from coincidence gate 230, which in turn removes the flashing signal from the lamp of the station sets having access to the active outgoing line. At the same time, however, "line memory" conductor 168 provides a steady signal to previously flashing lamps via conductors 209 and 231 and OR gate 228. Accordingly, the connection between the calling and called subscribers is now complete and the lamps associated with the active outgoing line are steadily lit.

Hold

If a subscriber desires to maintain an outgoing line in the "seized" condition, but free his station set from the transmission path established through the switching network so it may be connected elsewhere, for example to another outgoing line or to the system's intercommunication facility, he depresses hold key K2. Thereafter, a Φ3 service request pulse from input signaling lead 27 is passed to return signaling lead 30 through diode 32 and the closed contacts 25 and 26 of key K2. This pulse is then passed through full wave rectifier 78, coincidence gate 80 in coincidence with the Φ3 pulse from the clock circuit, coincidence gate 87, conductor 91, 96 and 97, and is applied to the first input terminal of coincidence gate 98. A second input terminal to coincidence gate 98 is energized through conductor 99 by transistor 135 which conducts whenever crosspoint 146 conducts. The third input terminal to coincidence gate 98 is connected to the rectified Φ3 output conductor of the clock. With the connections to coincidence gate 98 as described above, the Φ3, or hold pulse, is passed by gate 98 and coupled through conductor 108 firstly to the station release circuit through OR gate 105 and conductor 104, and secondly to monostable multivibrator 217 (FIG. 5) by conductor 220, cable 192, conductor 219 and OR gate 218. Conductor 220 is similarly coupled to the line control circuits of other lines to which the station set of FIG. 2 has access, for example by conductor 425.

When the Φ3 pulse is applied by conductor 104 to pulse stretcher 101 of station release circuit 100, the resulting output step is differentiated by circuit 103 and applied to activate monostable multivibrator 102. The output pulse from multivibrator 102 is applied through conductor 109, inhibit gate 110, conductor 111 and diode 153 to the base of transistor 154. The resulting positive wave developed across resistor 157 charges capacitor 426 through conducting crosspoint 146 to a potential which is slightly greater than the potential of positive source 144. Accordingly, when the pulse from monostable multivibrator 102, and concomitantly the pulse across resistor 157, subside, crosspoint 146 becomes slightly back biased and consequently returns to its nonconducting state. When crosspoint 146 becomes nonconducting, the supply of sustaining current for crosspoints 126 through 128 is cut off, thereby severing any existing transmission path through station circuit 125-1. The time constant of pulse stretcher 101 is slightly greater than a frame length of the service request pulses so that even though hold key K2 is depressed for a long enough period to allow more than one Φ3 pulse to be applied to the station release circuit, only a single pulse is generated by monostable multivibrator 102.

The Φ3 service request pulse applied to OR gate 218 (FIG. 5) activates monostable multivibrator 217 which applies a positive going signal to one input terminal of coincidence gate 214. When the transmission path through the switching network is severed as aforementioned, the "line memory" signal on conductor 168 falls from its former positive potential, which signal variation is inverted by inverter 112, differentiated by circuit 213 and applied to the second input terminal of coincidence gate 214. Since crosspoint 146 of the switching network is not switched to its nonconducting state until the occurrence of the trailing edge of the Φ3 service request pulse, monostable multivibrator 217 is designed to maintain an enabling signal on one input terminal of coincidence gate 214 until the fall of the "line memory" signal provides a second enabling signal to gate 214. The coincidence of enabling signals to gate 214 results in the application of a signal to the "S" terminal of multivibrator 211.

It will be observed that the action of differentiation circuit 239, inverter 216 and negative pulse clipper 240 on the falling "line memory" signal results in application of a positive pulse to the "R" terminal of bistable multivibrator 204, which tends to place multivibrator 204 in the reset condition and disable inhibit gate 205. However, when the "S" terminal of multivibrator is energized, as aforementioned, the positive going signal on conductor 241 is applied to the "S" terminal of multivibrator 204 and almost immediately re-establishes the enabling signal at its "1" terminal for inhibit gate 205. The resulting positive step appearing at the "1" terminal of multivibrator 211 is applied to OR gate 238 by conductor 241 and slow release circuit 242. Thus, even though a transmission path through the switching network is released, thereby removing the "line memory" input from OR gate 238, another signal replaces "line memory" in maintaining inhibit gate 205 activated. As a result, relay 206 remains operated and outgoing line No. 1 remains seized.

The positive going step on the "1" terminal of multivibrator 211 is also applied to an input terminal of coincidence gate 233. This permits signals from wink interrupter, or free running multivibrator 235, to be coupled through OR gate 228 and then applied to the distributor via conductor 77 to energize lamp 38 of the station sets at a distinctive rate indicative of the fact that outgoing line No. 1 is being held.

When the subscriber desires to be reconnected to the held line, he merely depresses the key 4 of his station set associated with the held line. Accordingly, the service request pulse associated with the held line is passed through the contacts of the depressed key to return signaling lead 30, and from there is eventually applied both to conductor 96 and to conductor 95 of the station control circuit (FIG. 3). As previously explained, the pulses on these two conductors cause oppositely poled potentials to be applied to the cathode and anode of the crosspoint associated with the held line, and thereby establish a transmission path through the switching network. As a consequence, a positive going "line memory" signal appears on conductor 168, is differentiated by differentiating circuit 208, and applied via conductor 215 to reset bistable multivibrator 211. Accordingly, the signal on conductor 241 which previously maintained outgoing line No. 1 in the held condition through slow release circuit 242 and OR gate 238 is removed, but is replaced by the "line memory" signal which is applied to coincidence gate 205 through conductor 236, slow release circuit 237 and OR gate 238.

Switching from line to line

When a subscriber desires to release an existing connection to one outgoing line and establish a new connection to another, for example to switch from outgoing line No. 1 to outgoing line No. 2, it is necessary to depress only that key, in the example here key K4, which is associated with the new outgoing line. As was previously mentioned, in the embodiment of the invention described herein the frame length of the service request pulses, or in other words, the time interval between successive clock pulses of the same phase, is approximately 25 milliseconds. It has been found that such a frame length is sufficiently short so that in most cases at least two service request pulses, of the same phase of course, are applied to return signaling lead 30 before the release of a depressed key. Accordingly, when key K4 is depressed, at least two Φ5 service request pulses, 25 milliseconds apart, are usually applied through input signal lead 28, diode 34 and contacts 25 and 26 of key K4 to return signalling lead 30. The first Φ5 service request pulse is passed through full wave rectifier 78, gate 80 in coincidence with the rectified Φ5 pulse from the clock circuit, gate 87, gate 92 in coincidence with the Φ5 pulse from OR gate 94, and through OR gate 105 to station release circuit 100. Accordingly, the connection through the switching network of the station set to an outgoing line is released in the exact same manner as when hold key K2 was depressed.

The second Φ5 service request pulse is also passed through rectifier 78 and coincidence gates 80 and 87 and establishes a speech path through crosspoint 128 in a manner similar to that described above in connection with the seizure outgoing line No. 1. The path to outgoing line No. 2 will not be released if more than two Φ5 service request pulses are passed through key K5 owing to the operating period of pulse stretcher 101 being slightly greater than one frame length of the service request pulses.

*The intercommunication facility*

The interconnection of subscribers over the intercommunication facility is accomplished in three basic steps; (1) the calling subscriber is connected to the intercommunication line, (2) the calling subscriber signals the called subscriber, and (3) the called subscriber answers and is connected to the intercommunication link. The first step, which is initiated by the calling subscriber depressing key K3, is accomplished in substantially the same manner in which a station set is connected through the switching network to an outgoing line. The Φ6 service request pulse, which appears on input signaling lead 28, is coupled through diode 33 and contacts 25 and 26 of key K3 to return signaling lead 30. This pulse is then passed through rectifier 78 and coincidence gates 80 and 87 from which it is simultaneously applied to station circuit 125-1 of the switching network through coincidence gate 92, and to the intercommunication circuit (FIG. 7) by conductors 96 and 290 and cable 247. More specifically, the Φ6 service request pulse from coincidence gate 92 is applied through conductor 95, diode 150, and capacitor 151 to the anode of crosspoint 146, whereupon a positive going pulse is applied through conductor 147, the parallel paths including shaping circuit 132 and transistor 137, conductor 130, the winding of transformer 76, and conductor 129, to the anode of crosspoint 127.

The Φ6 service request pulse from gate 87 is coupled through conductors 91, 96 and 290, cable 247, conductor 289, OR gate 288, inhibit gate 287 in coincidence with a Φ6 pulse from the clock circuit, inverter 451 and conductor 277 to the intercommunication line circuit 160-*i* of the switching network. In response, a negative going impulse is applied to the cathode of crosspoint 127 in the same manner that a negative going pulse is applied to the cathode of crosspoint 126 when a subscriber depresses the key associated with outgoing line No. 1. The coincidence of these positive and negative going pulses to the anode and cathode, respectively, of crosspoint 127 drive this element into conduction, which state of operation is maintained owing to the sustaining current supplied by source 144 through crosspoint 146.

When crosspoint 127 conducts, an "intercommunication memory" signal, similar in both origin and function to the previously mentioned "line memory" signal, appears on conductor 246. The intercommunication memory signal is differentiated by differentiating circuit 452, the negative spike clipped by diode 450 and the remaining positive spike applied to the "S" terminal of bistable multivibrator 256 which in turn activates dial tone generator 243. As a result, dial tone is applied to the calling subscriber's receiver through intercommunication link 242, intercommunication line circuit 160-*i*, conducting crosspoint 127 and transformer 76. In addition, the intercommunication memory signal is applied through conductor 246, cable 247, conductor 248, inhibit gate 249, conductor 79, inhibit gate 72, and OR gate 67, to transistor 61 to activate lamp 39 of the calling subscriber's set through input signaling lead 28 and diode 33. Similarly, the signal on conductor 246 is applied to the station control circuits of all other stations having access to the intercommunication facility, for example, by conductor 255, to provide an indication at these stations that the intercommunication facility is in use.

After dial tone appears in the calling subscriber's receiver, the second step may be initiated, that is to say, the calling subscriber signals the called subscriber by dialing a directory number associated with the called subscriber's set. If, for example, the calling subscriber desires to place a call to station set No. 5, he depresses the digit 5 pushbutton of his dialing array, thereby closing switches 43 and 49 which allow the Φ1 and Φ7 service request pulses to be applied to return dialing lead 55. These pulses are passed through rectifier 82, coincidence gates 84 and 120, and are applied to the inhibitory input of gate 141 by conductor 121. Consequently, corresponding voltage fluctuations appear on output conductor 259 of intercommunication line circuit 160-*i* (FIG. 4) in precisely the same manner that voltage fluctuations appear on output conductor 175 of line circuit 160-1 when the calling subscriber dials over outgoing line No. 1. These time coded signals are applied to biquinary decoder 260 which may be identical to the decoder circuit of FIG. 11 if ten or less stations have access to the intercommunication facility. Accordingly, an activating pulse is applied to the "S" terminal of the particular one of bistable multivibrators 253-1 through 253-10 which is associated with the set being signaled, in this case multivibrator 253-5. If, before the connection is completed to the called party, the calling party severs his connection to the intercommunication line, the "intercommunication memory" signal on conductor 246 falls from its positive potential and a reset pulse is applied to mulitivibrators 253-1 through 253-10 via inverter 510, differentiating circuit 511 and OR gate 427.

If station set 1 happens to be the called rather than the calling set, the output signal from biquinary decoder 260 is applied to the "S" terminal of multivibrator 253-1, and as a result a positive going signal is applied through conductor 254, cable 247 and gate 251 in coincidence with a signal from interrupter 252 to the inhibitory input of inhibit gate 249. This signal on conductor 254 and cable 247 is also applied through gate 271 in coincidence with signals from interrupter 428, and through coincidence gate 194 to conductor 76 which couples an interrupted signal through inhibit gate 69 and OR gate 64 to the base of transistor 58. Accordingly, tone ringer 37 is activated through input signaling lead 27 and diode 32 to notify the called subscriber of the presence of an incoming call. At the same time, an interrupted signal is produced by coincidence gate 249 and applied by conductor 79, inhibit gate 72, and OR gate 67, to the base of transistor 61, thereby flashing lamp 39 at a distinctive rate to indicate that the incoming call for this station is on the intercommunication link. The positive going signal from the "1" terminal of bistable multivibrator 253-1 is also applied through OR gate 274 to the "R" terminal of bistable multivibrator 256 to discontinue dial tone, and to ring back generator 244 to apply conventional ring back tone to the receiver calling subscriber's set via the intercommunication conductors 242 at a rate determined by interrupter 245.

The third step is initiated by the called subscriber lifting his handset and depressing intercommunication key K3. The Φ6 service request pulse appearing on the called subscriber's input signaling lead 28 is then coupled through diode 33 and closed contacts 25 and 26 of key K3 to return signaling lead 30. This pulse is then passed through rectifier 78 and coincidence gates 80 and 87, and is applied jointly to a station circuit 125–1 (FIG. 4) associated with the called station and to all line control circuits, including the intercommunication line control circuit of FIG. 7, to which the called station has access. More specifically, the Φ6 service request pulse is passed through coincidence gate 92, conductor 95, diode 150, and capacitor 151, and is applied to the anode of crosspoint 146 to switch that element into conduction. Consequently, as explained above, a positive going pulse is applied to the anode of crosspoints 126, 127 and 128 of the station circuit associated with the calling station. Concurrently, the Φ6 service request pulse is also passed through conductors 95 and 290, cable 247, conductor 289, OR gate 288, inhibit gate 287 in coincidence with the Φ6 pulse from the clock circuit, inverter 451 and is applied as a negative going pulse by conductor 277 to the cathode of crosspoint 127 in the same manner that a negative going pulse is applied to the cathode of crosspoint 126 when a transmission path is to be established to outgoing line No. 1. This coincidence of positive and negative going pulses at the crosspoint which connects the called set to the intercommunication link results in the establishment of a transmission path between these two specified points. Accordingly, since both the calling and called sets are now connected to intercommunication line 242, these sets are mutually interconnected and conversation between the subscribers may proceed.

The Φ6 service request pulse, after passage through inhibit gate 287, is also applied through conductor 276 and OR gate 427 to reset the particular multivibrator 253–1 through 253–10 associated with the called station. This disables coincidence gate 251 of the station control circuit associated with the called station, thereby causing lamps 39 of all station sets having access to the intercommunication facility to light steadily. Also, the signal previously applied through OR gate 274 to energize ringback generator 244 is removed, thereby terminating the transmission of ringback tone to the calling subscriber.

The intercommunication control circuit of FIG. 7 also includes a privacy feature which precludes other subscribers from being connected to an established intercommunication conversation after an answering subscriber has gained access to the intercommunication conductors 242. As shown, the output signal from gate 282 is coupled through diode 285 to provide an inhibitory input to inhibit gate 287. Accordingly, when the three input terminals to gate 282 are energized simultaneously, no further service request pulses can be passed through gate 287 to the switching network to afford other station sets access to the intercommunication line.

When the calling subscriber removes his handset from the cradle and depresses key K3 of his station set, he is connected through crosspoint 127 of the switching network to the intercommunication line 242, thereby initiating an intercommunication line memory signal which energizes one input terminal of coincidence gate 282 via conductor 283. When the called subscriber gains access to the intercommunication line, and in so doing resets the particular one of bistable multivibrators 253–1 through 253–10 associated with his station set, the negative going signal from OR gate 274 is inverted by inverter 429 and energizes another input terminal of gate 282 through conductor 281.

Absent monostable multivibrator 279 and its associated output lead 284, all input leads to gate 282 would now be energized, and consequently an inhibiting signal applied to gate 287 through diode 285 would prevent further Φ6 service request from being applied to the switching network. It will be recalled, however, that if the called party, in answering the call, switches from another line to the intercommunication link, the first Φ6 service request pulse merely releases the original connection through the switching network and the second Φ6 pulse establishes the new connection. Accordingly, monostable multivibrator 279 is designed to have a period slightly greater than the frame length of the service request pulses. Consequently, when the first Φ6 pulse from the called subscriber passes through gate 287, multivibrator 279 removes the positive signal from the input of gate 282 which prevents the second Φ6 pulse from being inhibited. This first Φ6 pulse also serves to apply a signal to the inhibit input of inhibit gate 278. More particularly, this Φ6 pulse is applied by conductor 276 and OR gate 427 to reset bistable multivibrators 253–1 through 253–10. The negative going signal from these multivibrators is applied through OR gate 274 and inverted by inverter 429 to a positive going signal which is applied to the inhibit input of gate 278 over conductor 280. Hence, shortly after the second Φ6 pulse causes the called subscriber to be connected to the intercommunication line, multivibrator 279 resets and all input terminals to gate 282 are activated. Thereafter, gate 287 is inhibited by the output signal from gate 282 and no further station sets can gain access to the link. When the calling and called parties return their handsets to the on hook position, the intercommunication line memory signal on conductor 246 is removed thereby allowing other subscribers normally having access to the intercommunication facility to once again gain access thereto.

Termination of a call

When a subscriber terminates his call and replaces handset 23 in its cradle, the contacts of switchhook 24 reopen, thereby de-energizing transistor 78 and removing positive potential from the input of inverter 107. As a result, a negative going impulse is changed to a positive going impulse by inverter 107 and is applied through differentiating circuit 106 and OR gate 105 to station release circuit 100. As was previously explained, the release circuit emits a positive going pulse which is applied through conductor 111, transistor 154, conductor 155, capacitor 151 and crosspoint 146 to charge capacitor 426. When the pulse from station release circuit 100 subsides, the charge developed on capacitor 426 reverse biases crosspoint 146, thereby switching this element into its nonconducting state. Consequently, positive source 144 is decoupled from crosspoints 126 through 128, thus switching these elements also into their nonconducting states and turning off transistors 165 and 166 of line circuit 160–1.

When transistor 165 turns off, the line memory signal on conductor 168 is removed, thereby imparting a negative going potential to junction 207. This negative going potential is applied through conductor 209, inverter 212, differentiator 213, conductor 225, and OR gate 293–1, to the "R" terminal of multivibrator 292–1. Accordingly, in the event that a calling subscriber disconnects before commencing or completing dialing the allotter is freed for further service immediately, and need not wait until gate 294–1 is energized by the driven ring counter 298. The negative going signal at junction 207 is also applied through a first path comprising conductor 236, slow release circuit 237 and OR gate 238 to de-energize inhibit gate 205. Accordingly, inhibit gate 205 is deactivated, thereby releasing line seizing relay 206 and opening make contacts 164. It will be observed that at this time the positive signals which were applied to OR gate 228 by either conductors 229, 231 or 232 have been removed, thereby retiring the appropriate lamps of the station sets having access to this line.

Although only a signal embodiment of the invention has been described herein, it should be apparent to one skilled in the art that numerous modifications and adaptations to the invention may be conceived without departing from the spirit and scope of the invention.

What is claimed is:

1. A selective signaling system comprising a plurality of telephone lines, a subscriber telephone set, said set including a plurality of key switches, a plurality of input signaling paths, and a return signaling path, each of said input leads being connectable to said return path through a plurality of said key switches, means for energizing said input paths in such manner that a unique signal is applied to each of said input paths per each key switch connected thereto, said unique signals being transferable to said return signaling lead by closure of said key switches, detector means for distinguishing those of said unique signals transferred to said return lead, and switching means connected to said detector means for selectively establishing transmission paths between said set and said lines in accordance with the unique signals distinguished by said detector means.

2. A selective signaling system comprising a plurality of telephone lines, a subscriber telephone set, said set including a plurality of key switches, said switches each having a pair of conductive contacts and means for establishing a current path through said switch by closure of said contacts, a plurality of input signaling paths, and a return signaling path, each of said input paths being separately connectable to said return path through any one of a plurality of said current paths, means for energizing said input paths in such manner that a unique signal is applied to each of said input paths per each current path through which that input path is connectable to said return path, detector means connected to said return path for distinguishing said unique signals which are transferred to said return path through any of said current paths, and switching means connected to said detector means for selectively establishing transmission paths between said set and said lines in accordance with the unique signals distinguished by said detector means.

3. A selective signaling system comprising a plurality of telephone lines, a subscriber telephone set, said set including a plurality of nonlocking key switches, a plurality of input signaling leads, a common return signaling lead, and a plurality of unidirectional signal translating elements, each of said input leads being connectable to said return lead through a pair of circuit paths each of which comprises one of said key switches and one of said diodes in series, said diodes in each of said pair of paths being poled oppositely with repsect to each other, clock means for sequentially energizing said input leads with pairs of oppositely phased pulses separated in time, said pulses being individually transferable to said return lead through said circuit paths, detector means including said clock means for generating a plurality of signals individually representative of which of said pulses energizing said input leads are coincident with pulses transferred to said return lead through said circuit paths, and switching means coupled to said detector means and operative in response to said signals for selectively establishing transmission paths between said set and said lines.

4. A selective signaling system comprising a plurality of telephone lines, a subscriber telephone set, said set including a plurality of input signaling leads, a return signaling lead, a plurality of indicators, and a plurality of key switches, each of said input leads being connected to said return lead through a plurality of said key switches interconnected in parallel, and each of said input leads being further connected to a plurality of said indicators interconnected in parallel, means for selectively energizing said input leads with first pulses suitable to activate individually said indicators connected to any one of said input leads, clock means for sequentially energizing said input leads with second pulses in such manner that a unique signal is applied to each of said input leads per each key switch connected thereto, detector means connected to said return lead for severally distinguishing said unique signals, switching means connected to said detector means for selectively establishing transmission paths between said set and said telephone lines in accordance with the unique signals distinguished by said detector means, and gating means coupled to said clock means for inhibiting the energization of said input leads with said first pulses during the occurrence of said second pulses.

5. A selective signaling system comprising a plurality of telephone lines, a subscriber telephone set, said set including a plurality of nonlocking key switches, a plurality of input signaling leads, a common return signaling lead, a plurality of indicators, and a plurality of unidirectional signal translating elements, each of said input leads being connectable to said return lead through a pair of first circuit paths each of which comprises one of said key switches and one of said diodes in series, said diodes in each of said pairs of first paths being poled oppositely with respect to each other, and each of said input leads being connected in a pair of second circuit paths each of which comprises one of said indicators and one of said diodes in series, said diodes in each of said pair of second paths being poled oppositely with respect to each other, means for selectively energizing said input leads with paths of oppositely phased first pulses suitable for activating said indicators, clock means for sequentially energizing said input leads with pairs of oppositely phased second pulses separated in time, said pulses being transferably to said return lead through said first paths, detector means including said clock means for generating a plurality of signals individually representative of which of said second pulses energizing said input leads are coincident with pulses transferred to said return lead through said first paths, switching means coupled to said detector means and operative in response to said signals for selectively establishing transmission paths between said set and said lines, and gating means coupled to said clock means for inhibiting the energization of said input leads with said first pulses during the occurrence of said second pulses.

6. A selective signaling system comprising a plurality of telephone lines, a subscriber telephone set, said set including a plurality of service switches, a plurality of dialing switches, a plurality of input signaling leads, a return signaling lead, and a return dialing lead, each of said input leads being connectable to said return, signaling lead through a plurality of said service switches, and at least one of said input signaling leads being connectable to said return dialing lead through a plurality of said dialing switches, means for sequentially energizing said input leads in such manner that a unique signal is applied to each of said input leads per each of said service switches connected thereto, said unique signals being transferable to said return signaling lead and said return dialing lead by closures of said service key switches and said dialing key switches respectively, detector means for distinguishing those of said unique signals transferred to said return signaling lead, decoding means for distinguishing those of said unique signals transferred to said return dialing lead, switching means connected to said detector means for selectively establishing transmission paths between said set and said lines in accordance with the unique signals distinguished by said detector means, and dial information generator means connected to said decoding means for generating dialing signals in accordance with the unique signals ditsinguished by said decoding means.

7. A selective signaling system comprising a plurality of telephone lines, a subscriber telephone set, said set including a plurality of service switches, a plurality of dialing switches, a plurality of input signaling leads, a plurality of input dialing leads, a return signaling lead, and a return dialing lead, each of said input signaling leads being connectable to said return signaling lead through a plurality of said service switches interconnected in parallel, and each of said input dialing leads being connectable to said return dialing lead through a plurality of said dialing switches interconnected in parallel, means for sequentially energizing said input signaling leads in such manner that a unique signal is applied to each of said input signaling leads per each of said service switches connected thereto, means for sequentially energizing said input dialing leads in such manner that a distinctive signal is applied to each of said input dialing leads per each of said dialing switches connected thereto, said unique signals and said distinctive signals being transferable to said return signaling lead and said return dialing lead by closure of said service switches and said dialing switches respectively, detector means for distinguishing those of said unique signals transferred to said return signaling lead, decoding means for distinguishing those of said distinctive signals transferred to said return dialing lead, switching means connected to said detector means for establishing transmission paths between said set and said lines in accordance with the unique signals distinguished by said detector means, and dial information generator means connected to said decoding means for generating dial signals in accordance with the distinctive signals distinguished by said decoding means.

8. In a selective signaling system comprising a plurality of subscriber telephone sets, a plurality of telephone lines, and a transmission network through which said sets are selectively connected to said lines, generating means for producing a sequence of pulses separated in time, individual ones of said pulses representing individual ones of said lines, means coupling said generating means to said sets for transferring said pulses to said sets, detector circuits associated with said sets, switch means disposed in said sets for selectively retransferring said pulses from said sets to said detector circuits, means included in said detector circuits for providing signals indicative of which of said lines is represented by said pulses retransferred to said detector circuits, and means associated with said transmission network for selectively establishing transmission paths coupling said sets to said lines in accordance with said signals.

9. In a selective signaling system comprising a plurality of subscriber telephone sets, a plurality of telephone lines, a transmission network through which said sets are selectively connected to said lines, generating means for producing a sequence of pulses separated in time, individual ones of said pulses representing individual ones of said pulses representing individual ones of said lines, means coupling said generating means to said sets for selectively transferring said pulses to said sets, detector circuits individually associated with said sets manually operable line-representing switch means disposed in said sets for selectively retransferring said pulses from said sets to the respective detector circuits associated with said sets, means including said detector circuits and said generating means for providing signals indicative of coincidence between a transferred pulse and a retransferred pulse, and means associated with said transmission network for selectively establishing transmission paths coupling said sets to said lines in accordance with said signals.

10. A selective signaling system comprising a plurality of subscriber telephone sets, a plurality of telephone lines, a plurality of transmission paths connecting said sets to said lines in a predetermined order, said paths being normally blocked by signal breakdown devices both connected in series therewith and normally residing in the nonconducting state, generating means for producing a sequence of pulses separated in time, individual ones of said pulses representing individual ones of said lines, means selectively coupling said generating means to said sets for transferring said pulses to said sets, detector circuits individually associated with said sets, a plurality of line-representing key switches disposed in each of said sets for selectively retransferring said pulses from said sets to the respective detector circuits associated with said sets, means including said detector circuits and said generating means for providing unblocking signals indicative of coincidence between a transferred pulse and a retransferred pulse, and means connected between said detector circuits and said transmission paths in a predetermined order for selectively applying unblocking signals to said signal breakdown devices.

11. In a key telephone system of the type in which commands for utilizing the various services available at a subscriber set in said system are manifested by the actuation of particular keys of said set respectively associated with individual ones of said services, a single input lead to said set per a group of said services, a single return lead from said set, means for periodically energizing said input lead with a unique signal per each service of said group, individual ones of said signals which represent particular services being selectively transferable from said input lead to said return lead through said respective key switches associated with said particular services, detector means for recognizing which of said unique signals has been transferred from said input lead to said return lead, and means associated with said detector means for generating control pulses indicative of the signal which is recognized, whereby only a single input lead and a single return lead are required for selective transmission of commands for a plurality of different services manifested by a subscriber at said set.

12. In a key telephone system of the type in which commands for utilizing the various services available at a subscriber set in said system are manifested by the actuation of particular keys of said set respectively associated with individual ones of said services, a single input lead to said set per each pair of said services, a single return lead from said set for all of said services, clock means for periodically energizing said input lead with a pair of oppositely phased pulses separated in time, each pulse of said pair of pulses representing a different service of said pair of services, switch means for selectively transferring said pulses from said input lead to said return lead by the actuation of the key associated with service represented by the transferred pulse, detector means for recognizing which signal of said pair of signals has been transferred to said return lead, and means associated with said detector means for generating signals indicative of said recognized signal, whereby only a single input lead per each pair of services and a single return lead for all of said services are required for selective transmission of commands for a plurality of different services manifested by a subscriber at said set.

13. The combination of elements set forth in claim 12 wherein said switch means comprises first and second conduction paths connecting said input lead to said return lead, said first path includes a unidirectional current conducting element poled for current flow from said input lead to said return lead, and said second path including a unidirectional current conducting element poled for current flow from said return lead to said input lead.

No references cited.

ROBERT H. ROSE, *Primary Examiner.*

WALTER L. LYNDE, *Examiner.*